(12) United States Patent
Miyata

(10) Patent No.: US 8,798,054 B2
(45) Date of Patent: *Aug. 5, 2014

(54) IP NETWORK SYSTEM

(75) Inventor: Hiroshi Miyata, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 928 days.

This patent is subject to a terminal disclaimer.

(21) Appl. No.: 12/698,676

(22) Filed: Feb. 2, 2010

(65) Prior Publication Data

US 2010/0195649 A1 Aug. 5, 2010

(30) Foreign Application Priority Data

Feb. 3, 2009 (JP) ................................. 2009-022354

(51) Int. Cl.
 *H04L 12/56* (2006.01)
(52) U.S. Cl.
 USPC ........................................................ 370/390
(58) Field of Classification Search
 USPC ......................................... 370/226, 390, 404
 See application file for complete search history.

(56) References Cited

U.S. PATENT DOCUMENTS

| 7,310,688 B1 * | 12/2007 | Chin ............................ 709/252 |
| 8,009,683 B2 * | 8/2011 | Miyata et al. .................. 370/404 |
| 2004/0213564 A1 * | 10/2004 | Sakano et al. .................. 398/12 |

FOREIGN PATENT DOCUMENTS

| JP | 2004242194 A | 8/2004 |
| JP | 2005-218112 A | 8/2005 |
| JP | 2008118272 A | 5/2008 |

OTHER PUBLICATIONS

Japanese Office Action corresponding to Japanese Patent Application No. 2009-022354, dated May 2, 2011.

* cited by examiner

*Primary Examiner* — Dang Ton
*Assistant Examiner* — Kevin Lee
(74) *Attorney, Agent, or Firm* — Sughrue Mion, PLLC

(57) ABSTRACT

The invention implements an IP network system capable of causing a packet to reach a destination with reliability even if a trouble occurs to any of routers. The IP network system wherein packet communication is executed between respective hosts through the intermediary of a ring network comprised of at least a plurality of repeaters, the respective repeaters comprising an arithmetic and control unit for transferring a packet to the host at a transmission destination via a clockwise route, and a counterclockwise route, in the ring network, respectively, on the basis of transfer direction information contained in a tunneling packet generated on the basis of a packet transmitted from the host at a transmission source, as one of the respective hosts, to the host at the transmission destination, and subjected to multicast transmission to a multicast address where the host at the transmission destination belongs.

12 Claims, 32 Drawing Sheets

FIG. 4

| | DESTINATION ADDRESS | TUNNELING END-POINT ADDRESS | PACKET ID | RING ID | CLOCKWISE PACKET TRANSFER DESTINATION | COUNTERCLOCKWISE PACKET TRANSFER DESTINATION |
|---|---|---|---|---|---|---|
| ROUTE 1 | IPv6 ADDRESS OF HOST EQUIPMENT 17 | IPv6 ADDRESS OF TUNNELING DEVICE 16 | PKT 0 | RING 1 | C::1 | C::3 |
| ROUTE 2 | | | | | | |
| ROUTE 3 | | | | | | |
| ... | | | | | | |
| ROUTE n | | | | | | |

FIG. 22

DIRECTION-DECISION PACKET: P40

| IPv6 HEADER | START-POINT IP ADDRESS | A::1 |
| | END-POINT IP ADDRESS | LINK LOCAL MULTICAST ADDRESS |
| PAYLOAD | MESSAGE TYPE | DIRECTION-DECISION |
| | RING ID | RING 1 |
| | ROUTER ID | A::1 |
| | HOP COUNT | 0 |

FIG. 23

| DIRECTION-DECISION REJECTION PACKET: P41 | | |
|---|---|---|
| IPv6 HEADER | START-POINT IP ADDRESS | A::2 |
| | END-POINT IP ADDRESS | A::1 |
| PAYLOAD | MESSAGE TYPE | DIRECTION DECISION REJECTION |
| | RING ID | RING 1 |
| | MINIMUM ROUTER ID | A::0 |
| | HOP COUNT | 1 |

FIG. 26

DIRECTION-SETTING PACKET: P51

| IPv6 HEADER | START-POINT IP ADDRESS | C::1 |
| | END-POINT IP ADDRESS | IPv6 ADDRESS OF ROUTER 14 |
| PAYLOAD | MESSAGE TYPE | DIRECTION SETTING |
| | RING ID | RING 1 |
| | ROUTER NUMBERS INSIDE A RING | 3 |
| | INTERFACE NAME | IF-LEFT |
| | ADDRESS | C::1 |

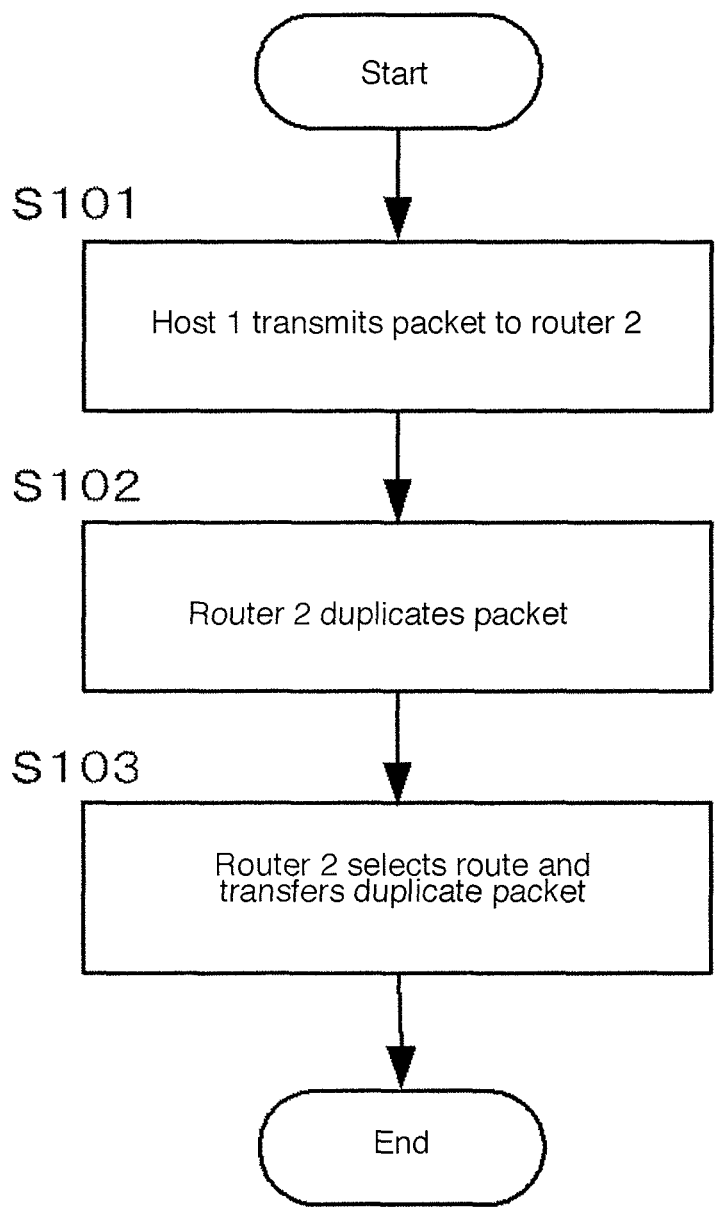

IP NETWORK SYSTEM

FIELD OF THE INVENTION

The present invention relates to an IP network system, and more specifically, to an IP network system capable of causing an IP packet to reach a destination with reliability even if a trouble occurs to the network

BACKGROUND OF THE INVENTION

With an IP network system for transmitting data by use of a conventional IP (an Internet Protocol), a router duplicates a packet to be transmitted to generate a plurality of duplicate packets, and the plurality of the duplicate packets are transferred to a destination via a plurality of routes, thereby enabling the packet from a transmission source to reach the destination even if a trouble occurs to any of the routes.

The related art associated with the conventional IP network system includes the following.
[Patent Document 1] JP 2005-218112A FIG. 31 is a configuration block diagram showing an example of a conventional IP network system. In FIG. 31, hosts 1, 4 each have a communication function for transmitting a packet by use of the conventional IP. Routers 2, 3 each have a communication function, and a routing function for selecting a route through which a packet is to be transmitted. The host 1, and the router 2 are mutually connected to each other, and the routers 2, 3 are connected to each other through the intermediary of a complex network NW100 comprised of a plurality of repeaters such as switches, routers, and so forth. Further, the router 3, and the host 4 are mutually connected to each other.

Further, FIG. 31 shows a packet communication DF100 flow whereby the router 2 transmits a packet to the router 3 via a route A inside the network NW100, and a packet communication DF101 flow whereby the router 2 transmits a packet to the router 3 via a route B inside the network NW100.

FIG. 32 is a flow chart for describing an operation of the IP network system. First, in step S101, the host 1 generates a packet whose final destination is the host 4, containing data such as measured data, and so forth, transmitting the packet to the router 2.

In step S102, the router 2 duplicates the packet received from the host 1. In the case of transferring the packet via two routes, for example, the routes A, B, as shown in FIG. 31, the router 2 duplicates two packets (for example, a duplicate packet PKT-A, and a duplicate packet PKT-B) out of the packet received from the host 1.

In step S103, the router 1 transfers the two duplicate packets to the router 3 through the intermediary of the network NW100 on the basis of preset routing-information.

The router 2 transfers the duplicate packet PKT-A along the route A to the router 3, as shown in, for example, the packet communication DF100 flow of FIG. 31, and the duplicate packet PKT-B along the route B to the router 3, as shown in the packet communication DF101 flow.

Then, the router 3 transfers either of the packets received from the router 2 (for example, the duplicate packet PKT-A, or the duplicate packet PKT-B) to the host 4.

Thus, the router duplicates the packet received from the transmission source, and transfers those duplicate packets via a plurality of the routes, respectively, so that even if packet communication is disabled due to a trouble occurring to any of the routes, the duplicate packet is transferred via another route, thereby enabling the packet from the host at the transmission source to reach the host at destination.

Now, there can be the case where the IP network system described as above ends up having a configuration wherein the respective routes each pass through the same router (including, for example, the case where both the routes A, B inevitably pass through a router X), depending on routing executed by the respective routers. In such a case, there has been encountered the case where packet communication is disabled along all the routes if a trouble occurs to the router X.

In order to preempt the inability to execute packet communication along all the routes upon occurrence of a trouble at a certain router, there is the necessity of setting such that the respective routes each do not pass through the same router. Accordingly, setting of routing by all the routers has been precisely pre-designed, and subsequently, control•setting of a routing table for all the routers has been in practice.

However, with a method for setting routing for all the routers in order to prevent the respective routes from passing through the same router, a problem is encountered in that routing for all the routers must be set every time a system configuration is changed. Furthermore, such a method as described has another problem in that since the routing table for all the routers must be controlled, much time is required in maintenance.

SUMMARY OF THE INVENTION

The present invention has been developed in order to solve the problems described as above, and it is therefore an object of the present invention to implement an IP network system capable of causing a packet to reach a destination with reliability even if a trouble occurs to any of routers.

To that end, in accordance with one aspect of the invention, there is provided an IP network system wherein packet communication is executed between respective hosts through the intermediary of a ring network comprised of at least a plurality of repeaters, the respective repeaters comprising an arithmetic and control unit for transferring a packet to the host at a transmission destination via a clockwise route, and a counterclockwise route, in the ring network, respectively, on the basis of transfer direction information contained in a tunneling packet generated on the basis of a packet transmitted from the host at a transmission source, as one of the respective hosts, to the host at the transmission destination, and subjected to multicast transmission to a multicast address where the host at the transmission destination belongs.

With the IP network system, the repeater may comprise a memory for storing the multicast address where the host at the transmission destination belongs, and network addresses of other repeaters connected to the repeater itself, and at least any of the respective hosts, a communication unit for executing packet communication with the respective hosts, and other repeaters, and receiving the packet transmitted from the host at the transmission source to the host at the transmission destination, and an arithmetic and control unit for applying encapsulation processing to the packet, thereby generating and duplicating a tunneling packet while adding transfer direction information to the tunneling packet before effecting multicast transmission to the multicast address, and transmitting the tunneling packet in the clockwise direction, and the counterclockwise direction, in the ring network, respectively, on the basis of the transfer direction information, upon receiving the tunneling packet via the communication unit, or if a host belonging to a destination group of the tunneling packet as received is connected to the repeater itself, reproducing the packet before application of the encapsulation processing, thereby transferring the packet to the host at the transmission destination.

The IP network system may further comprise a plurality of tunneling devices, the tunneling devices each comprising a communication unit for executing packet communication between the ring network and the respective hosts, and receiving the packet transmitted from the host at the transmission source to the host at the transmission destination, a memory for storing the multicast address where the host at the transmission destination belongs, and network addresses of other repeaters connected to the repeater itself, and at least any of the respective hosts, and an arithmetic and control unit for applying encapsulation processing to a packet from the host at the transmission source, thereby generating and duplicating the tunneling packet while adding transfer direction information to the tunneling packet before effecting multicast transmission to the multicast address, and upon receiving the tunneling packet via the communication unit, reproducing the packet before application of the encapsulation processing, thereby transferring the packet to the host at the transmission destination.

In accordance with another aspect of the invention, there is provided an IP network system wherein packet communication is executed between respective hosts through the intermediary of a ring network comprised of at least a plurality of repeaters, said IP network system comprising tunneling devices each comprising a communication unit for executing packet communication between the ring network and the respective hosts, and receiving a packet transmitted from the host at a transmission source to the host at a transmission destination, and an arithmetic and control unit for generating a tunneling packet on the basis of the packet, and duplicating the tunneling packet while adding transfer direction information to the tunneling packet before effecting multicast transmission to a multicast address where the host at the transmission destination belongs, the repeaters each comprising an arithmetic and control unit for transferring the packet to the host at the transmission destination via a clockwise route, and a counterclockwise route, in the ring network, respectively, on the basis of transfer direction information contained in the tunneling packet.

Further, with the IP network system, the respective tunneling devices may comprise a memory for storing the multicast address where the host at the transmission destination belongs, and network addresses of other repeaters connected to the repeater itself, and at least any of the respective hosts, and an arithmetic and control unit for applying encapsulation processing to the packet, thereby generating and duplicating a tunneling packet while adding transfer direction information, and a multicast address where the host at the transmission destination belongs to the tunneling packet duplicated before effecting multicast transmission to the multicast address, reproducing the packet before application of the encapsulation processing, upon receiving the tunneling packet via the communication unit, thereby transferring the packet to the host at the transmission destination.

Still further, with the IP network system, the respective repeaters may transmit a direction-setting packet for setting a transfer direction to other repeaters connected to the same ring network, sharing the transfer direction with other repeaters while the communication unit may be provided with first and second communication interfaces for transferring a tunneling packet in a given direction in the ring network, and upon the first communication interface receiving the direction-setting packet from other repeaters, the arithmetic and control unit may set the first communication interface as an interface for transmitting a packet in the counterclockwise direction (or in the clockwise direction), setting the second communication interface as an interface for transmitting the packet in the clockwise direction (or in the counterclockwise direction).

With the present invention, since the respective repeaters, such as the routers, the tunneling device, and so forth, are provided with an arithmetic and control unit for transferring a packet to the host at a transmission destination via a clockwise route, and a counterclockwise route, in the ring network, respectively, on the basis of transfer direction information contained in a tunneling packet generated on the basis of a packet transmitted from a transmission source host executing packet communication via a ring network to the host at the transmission destination, and subjected to multicast transmission to a multicast address where the host at the transmission destination belongs, the packet from the transmission source host is transferred to the transmission destination via the clockwise route, and the counterclockwise route, in the ring network, respectively, so that the packet can reach the transmission destination with reliability even if a trouble occurs to any of the routes.

Further, with the present invention, since the respective repeaters, such as the routers, the tunneling device, and so forth, transmit the tunneling packet to the multicast address where the host at the transmission destination belongs, the present invention is effective in that the invention can be applied to controlled data communication making use of multicast communication carried out in a field control network made up of field equipment such as a sensor, an actuator, a controller, and so forth. Therefore, the packet under field control can reach the host at the transmission destination with reliability even if a trouble occurs to any of routes over the field control network.

Still further, with the present invention, since respective entries contained in the transfer-target multicast information storage of the tunneling device are controlled by the time, the entry that is no longer required can be deleted after a given time length, so that it is possible to do without transferring an unnecessary packet even if the host at the transmission destination gets out of a multicast group without taking a correct step.

BRIEF DESCRIPTION OF THE DRAWINGS

FIG. 4 is a schematic representation showing an example of tunneling-preparation information stored in a tunneling-preparation information storage;

FIG. 22 is a view showing a packet format of the direction-decision packet;

FIG. 23 is a view showing a packet format of a direction-decision rejection packet;

FIG. 26 is a view showing a packet format of a direction-setting packet;

FIG. 32 is a flow chart for describing an operation of the conventional IP network system.

DETAILED DESCRIPTION OF THE PREFERRED EMBODIMENTS

With an IP network system according to the present invention, respective hosts execute packet communication through the intermediary of a ring network comprised of repeaters such as mainly routers, and so forth, each repeater having a routing function, however, for brevity in explanation, description is given hereinafter on the assumption that the ring network is comprised of a plurality of routers.

Figure 1:
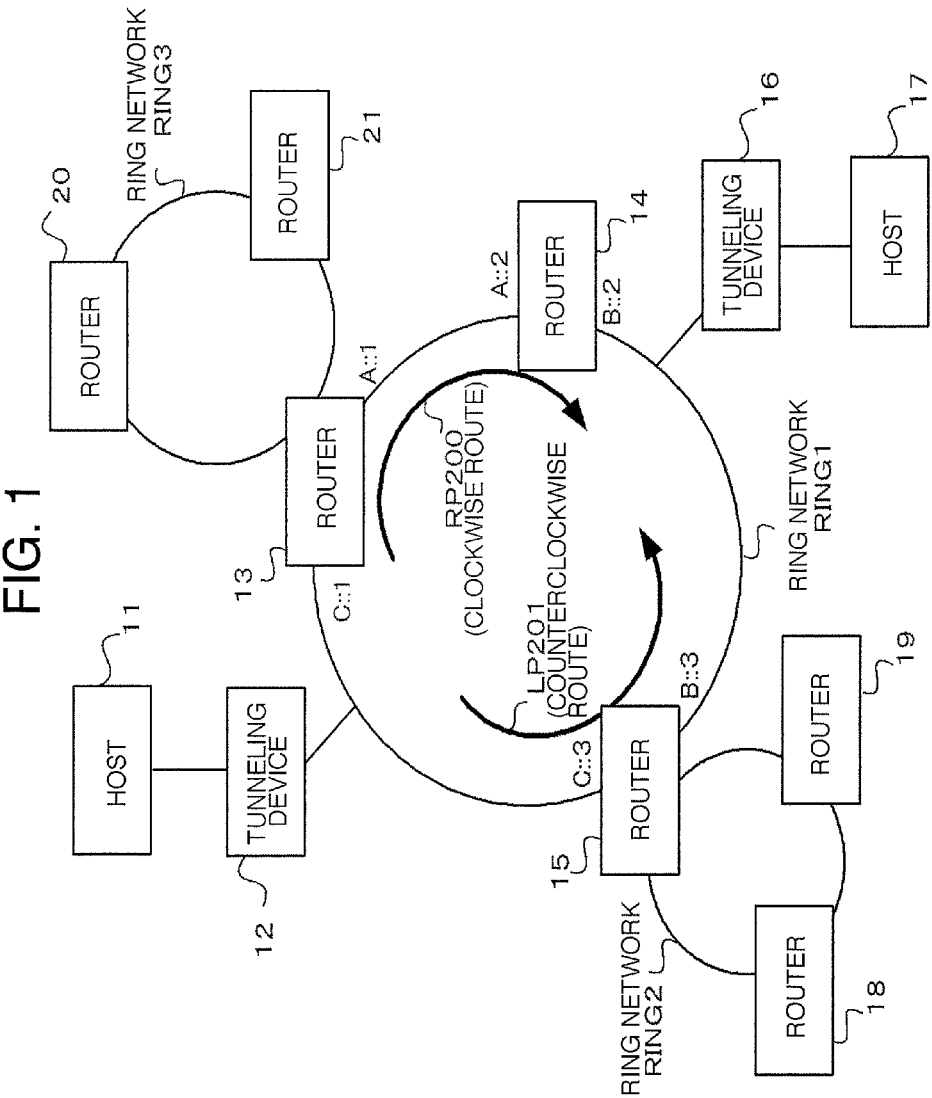
FIG. 1 is a configuration block diagram showing one embodiment of an IP network system according to the present invention.

FIG. 1 is a configuration block diagram showing one embodiment of an IP network system according to the present invention. In FIG. 1, a host 11, and a tunneling device 12 are connected to each other, and the tunneling device 12 is connected to routers 13, 15, respectively. A router 14 is connected to the routers 13, 15, and a tunneling device 16, respectively. The tunneling device 16 is connected to the routers 14, 15, and a host 17, respectively. A router 18 is connected to the router 15, and a router 19, respectively, and a router 20 is connected to the router 13, and a router 21, respectively.

The routers 13 to 15 make up a first ring network RING1, the routers 15, 18, 19 make up a second ring network RING2, and the routers 13, 20, 21 make up a third ring network RING3. The hosts 11, 17 each have a communication function for transmitting a packet mainly by use of IPv6 (Internet Protocol Version 6).

The tunneling devices 12, 16 each have not only a communication function but also a tunneling packet generation function for adding an IP header and various expansion headers to a packet mainly from the host 11 or the host 17 to apply encapsulation processing thereto, thereby generating a tunneling packet for use in tunneling communication, a tunneling packet release function for applying de-capsulation processing to the tunneling packet, thereby extracting a packet, a packet duplication function for duplicating the packet, a transfer determination function for determining whether or not a received packet has already been transferred, and so forth.

The routers 13 to 15, and the routers 18 to 21 each have a communication function, and a routing function for selecting a route through which a packet is to be transferred.

Further, a communication unit of each of the routers has a plurality of communication interfaces, two communication interfaces thereof are connected to the same ring network, and the IPv6 address is assigned to the two communication interfaces, respectively. With the present embodiment, the IPv6 addresses "A::1", "C::1" are assigned to the router 13, the IPv6 addresses "A::2", "B::2" are assigned to the router 14, and the IPv6 addresses "B::3", "C::3" are assigned to the router 15. Herein, letters A, B, C each represent prefix of the IPv6 address.

Further, FIG. 1 shows "a clockwise route RP200" whereby a packet is transferred to the tunneling device 16 via the routers 13, 14, inside the ring network, and "a counterclockwise route LP201" whereby a packet is transferred to the tunneling device 16 via the router 15.

Herein, a route direction in which a packet is transferred from the tunneling device 12 to the tunneling device 16 via the routers 13, 14 is called "a clockwise direction" while a route direction in which a packet is transferred from the tunneling device 12 to the tunneling device 16 via the router 15 is called "a counterclockwise direction". And the packet transferred in the clockwise direction is called "a clockwise packet", and the packet transferred in the counterclockwise direction is called "a counterclockwise packet".

In FIG. 1, use of the routers 13 to 15 and 18 to 21 is described, however, use may be made of repeaters, each having a routing function. Further, it is described that the ring network is comprised of the respective routers, however, the repeaters, each having a routing function, may make up the ring network.

Figure 2:
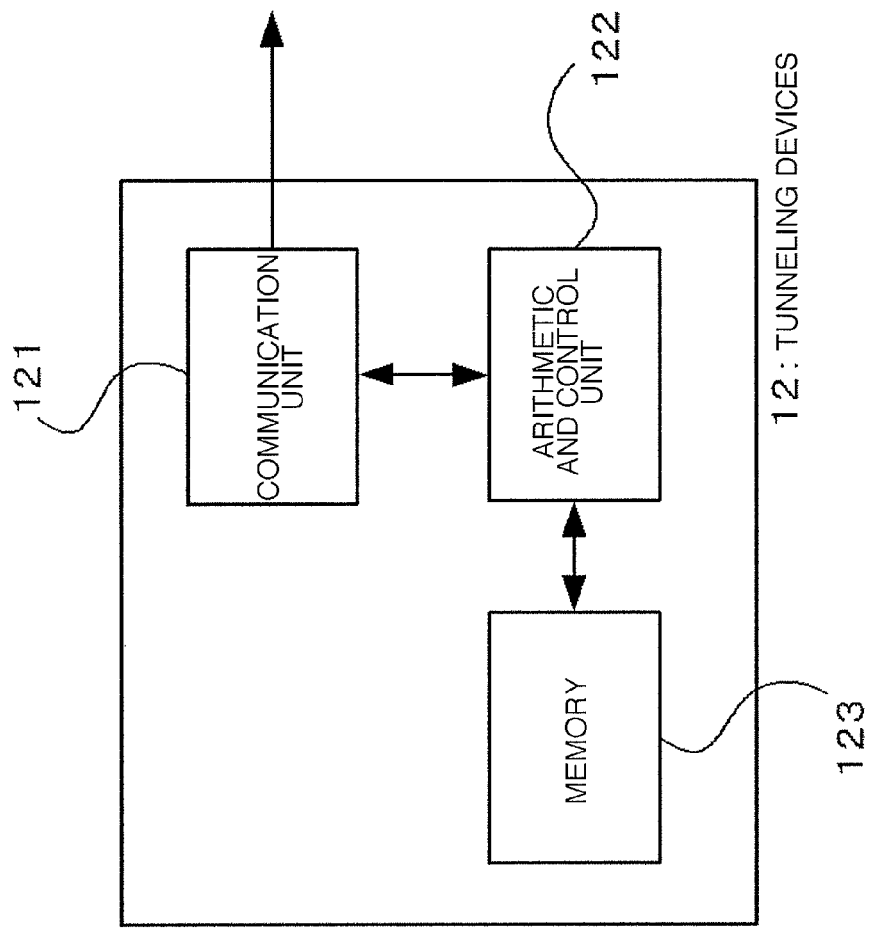
FIG. 2 is a configuration block diagram showing a tunneling device shown in FIG. 1.

FIG. 2 is a configuration block diagram showing a specific example of the tunneling device 12 shown in FIG. 1. In FIG. 2, a communication unit 121 is connected to an arithmetic and control unit 122, and the arithmetic and control unit 122 is connected to a memory 123. The communication unit 121 executes communications mainly between the host 11, and the routers 13, 15, respectively. The arithmetic and control unit 122 is for controlling operations of the respective units, making use of, for example, a CPU (Central Processing Unit). The memory 123 stores OS (Operating System), a program for running the tunneling device 12, routing-information, various information pieces, and so forth. The tunneling device 16 as well has a configuration similar to that for the tunneling device 12.

Figure 3:
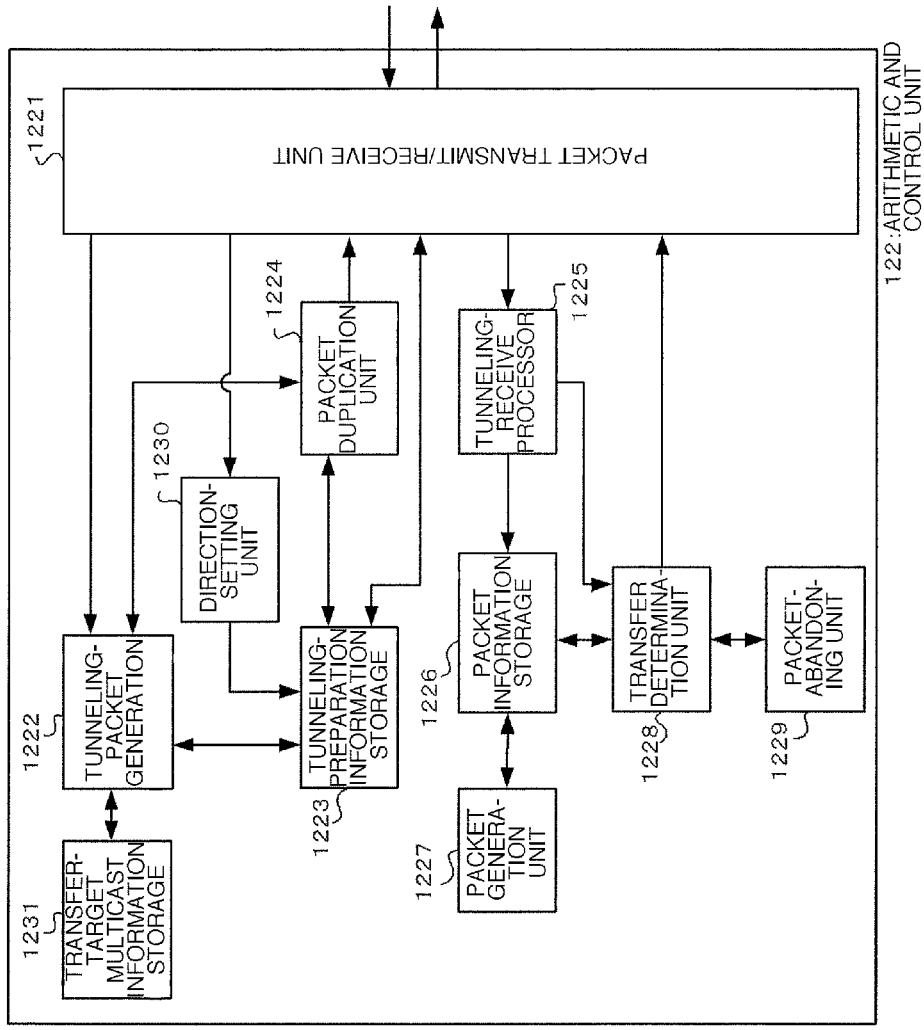
FIG. 3 is a view showing an example of a functional block diagram of an arithmetic and control unit 122 as a constituent of the tunneling device in FIG. 2.

FIG. 3 is a view showing an example of a functional block diagram of the arithmetic and control unit 122 as a constituent of the tunneling device 12 in FIG. 2. A packet transmit/receive unit 1221 executes transmit/receive of a packet such as packets mainly from the hosts 11, 17, respectively, a tunneling packet, and so forth. A tunneling packet generation unit 1222 adds transfer direction information indicating the clockwise direction, and the counterclockwise direction, in a ring network, respectively, on the basis of tunneling-preparation information stored in a tunneling-preparation information storage 1223, to the packet from the host 11, and applies encapsulation processing for adding the IP header and various expansion headers thereto, thereby generating a tunneling packet for use in tunneling communication between the tunneling devices.

The tunneling packet generation unit 1222 adds the transfer direction information indicating the clockwise direction, and the counterclockwise direction, in the ring network, respectively, on the basis of the tunneling-preparation information stored in the tunneling-preparation information storage 1223, to the packet from the host 11, and applies the encapsulation processing for adding the IP header and various expansion headers thereto, thereby generating the tunneling packet for use in tunneling communication between the tunneling devices. Further, the tunneling packet generation unit 1222 determines a destination of the tunneling packet generated out of the packet from the host 11, on the basis of multicast information stored in a transfer-target multicast information storage 1231, as a multicast address at the destination of the packet from the host 11.

The tunneling-preparation information storage 1223 stores routing-information on a route for transferring a tunneling packet from the tunneling device 12 to a host equipment 17 at a transmission destination, and the tunneling-preparation information for generation of the tunneling packet. A packet duplication unit 1224 duplicates the tunneling packet, and sets transfer direction information (for example, the clockwise direction) on a duplicated tunneling packet to a direction opposite to the transfer direction information (for example, the counterclockwise direction) on the tunneling packet at a duplication source.

A tunneling-receive processor 1225 analyzes the tunneling packet which the packet transmit/receive unit 1221 has received from the respective routers before storing "tunneling packet information" on transmission destinations, transmission sources, information on a packet before application of encapsulation processing, and so forth, in a packet information storage 1226. The packet information storage 1226 stores "tunneling packet information" as analyzed by the tunneling-receive processor 1225, and "transferred packet information" that is information on a packet that has been transferred from the tunneling device 12 to a host as a final transmission destination.

A packet generation unit 1227 executes de-capsulation processing on the basis of the tunneling packet information stored in the packet information storage 1226, thereby reproducing the packet before application of the encapsulation processing, that is, a packet as received from the host at the transmission source. Depending on whether or not a packet identical to the tunneling packet received from the host at the transmission source is stored in the packet information storage 1226, a transfer determination unit 1228 determines whether or not the packet reproduced after subjected to the de-capsulation processing has already been transferred to the host at the final transmission destination, transferring the packet reproduced to the host at the final transmission destination if the packet reproduced has not been transferred as yet.

If the packet identical to the tunneling packet that the transfer determination unit 1228 has received from the host at the transmission source is stored in the packet information storage 1226, a packet-abandoning unit 1229 abandons packets such as the tunneling packet, reproduced packet, and so forth. A direction-setting unit 1230 acquires a transfer-destination address of the clockwise packet, or the counterclockwise packet before setting a direction.

The transfer-target multicast information storage 1231 stores the multicast information providing a transfer target of a tunneling packet in order to effect multicast communication of the tunneling packet to a multicast address where the host at the transmission destination belongs.

FIG. 4 is a schematic representation showing an example of tunneling-preparation information stored in the tunneling-preparation information storage. As shown in FIG. 4, the tunneling devices 12, 16 each have the tunneling-preparation information storage comprising a plurality of "routing-information" fields, each for use in preparation of a tunneling packet.

Those routing-information fields each has fields such as "a destination address" (for example, the IPv6 address of the host equipment 17) where the final transmission destination of the tunneling packet is stored, "a tunneling end-point address" (for example, the IPv6 address of the tunneling device 16) where a transmission destination of tunneling communication is stored, "ring ID" (for example, "RING1") where identification information on respective ring networks are stored, "packet ID" (for example, "PKT0") where identification information on respective tunneling packets are stored, "a clockwise-packet transfer destination" (for example, the IPv6 address of the router 13: "C::1") where the address of a router for transferring a clockwise packet, and so forth are stored, "a counterclockwise-packet transfer destination" (for example, the IPv6 address of the router 15: "C::3") where the address of a router for transferring a counterclockwise packet, and so forth are stored, and so forth.

Figure 5:
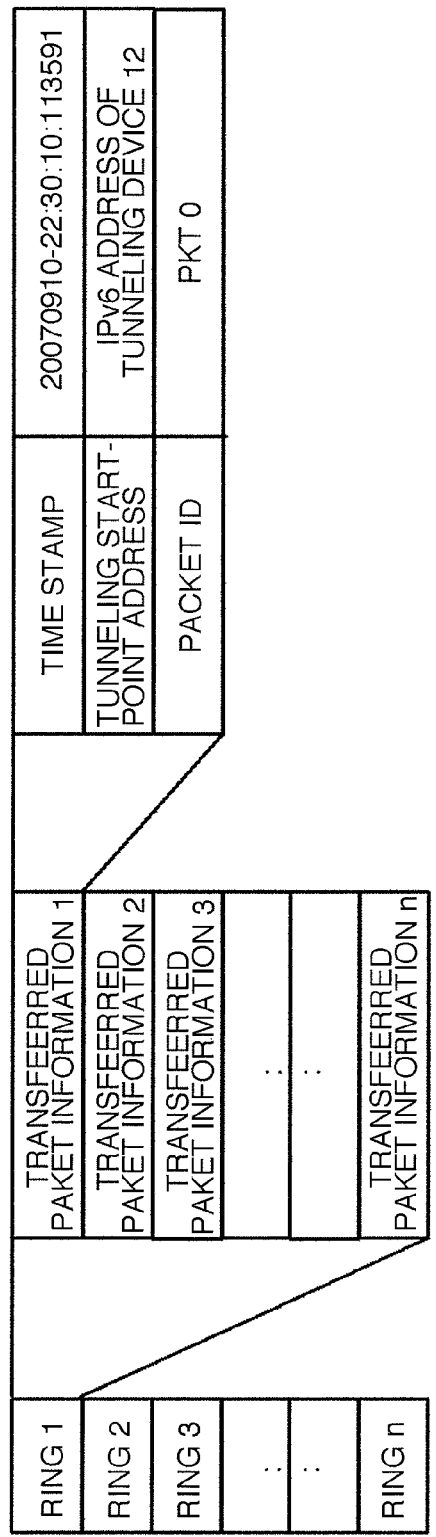
FIG. 5 is a schematic representation showing an example of transferred packet information stored in a packet information storage.

FIG. 5 is a schematic representation showing an example of the transferred packet information stored in the packet information storage 1226. As shown in FIG. 5, the tunneling devices 12, 16 each have the packet information storage comprising a plurality of "ring" fields, each showing a ring where a packet belongs. The ring fields each have a plurality of transferred packet information pieces, and each piece of the transferred packet information comprises fields such as time stamp (for example, 20070910-22:30:10.113591) for storing a time when a tunneling packet is received from a tunneling device as the start point of tunneling communication via a ring network, "a tunneling start-point address" (for example, the IPv6 address of the tunneling device 12) for storing an address of the tunneling device as the start point of the tunneling packet as received, "packet ID" (for example, "PKT0") where identification information on the packet transferred to a host at the final transmission destination is stored, and so forth.

Figure 6:
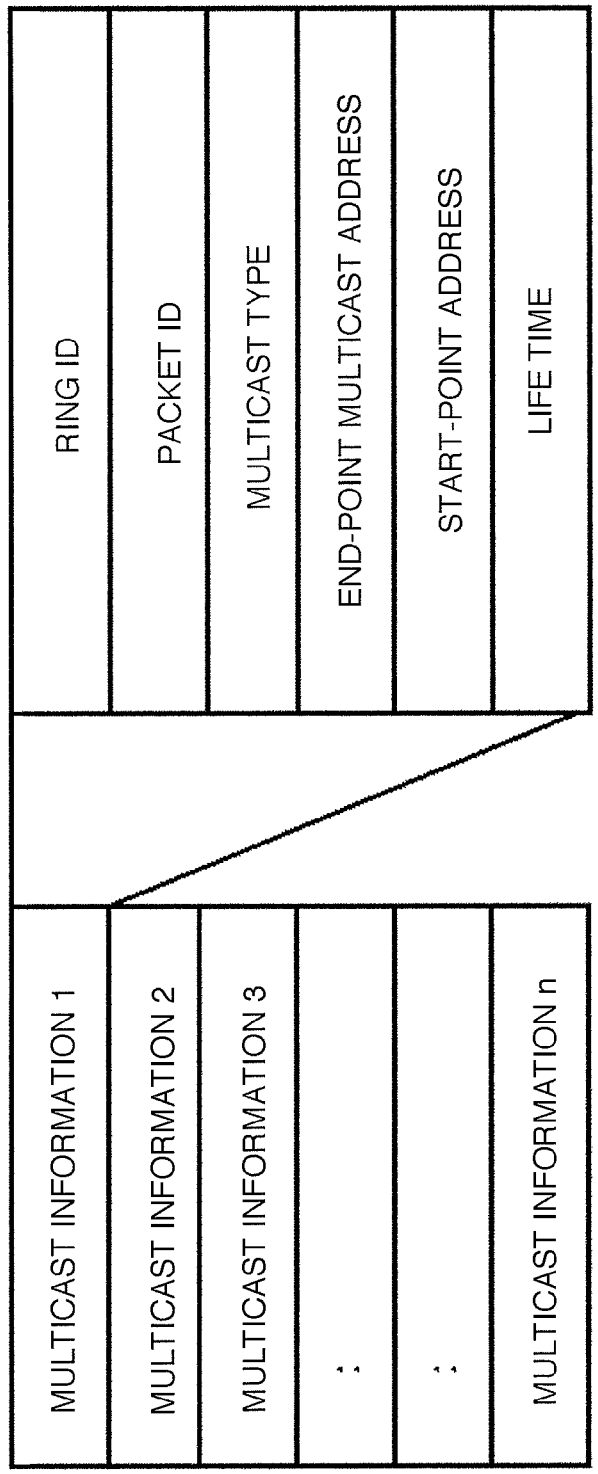
FIG. 6 is a schematic representation showing an example of multicast information stored in a transfer-target multicast information storage 1231.

FIG. 6 is a schematic representation showing an example of the multicast information stored in the transfer-target multicast information storage 1231. As shown in FIG. 6, the tunneling devices 12, 16 each have the packet information storage comprising a plurality of "multicast information" fields, the multicast information fields each providing a multicast information as a transfer target of a tunneling packet. The multicast information field comprises fields such as "ring ID" where a ring identifier is stored, "packet ID" where a tunneling packet identifier for identification of a packet as received by a tunneling device is stored, "multicast type" where multicast information (for example, SSM: 1, non-SSM: 0) showing validation•invalidation of SSM (Source-Specific-Multicast) is stored, "an end-point multicast address" where endpoint address information on a multicast packet is stored, "a start-point address" where start-point address information on the multicast packet is stored, "life time" where effective time (remaining time) of a relevant entry is stored, and so forth.

Further, the tunneling device and the router each can be selectively set to SSM, or ASM (Any-Source-Multicast) as a method for implementation of the multicast communication, thereby enabling those operations to be implemented.

Figure 7:
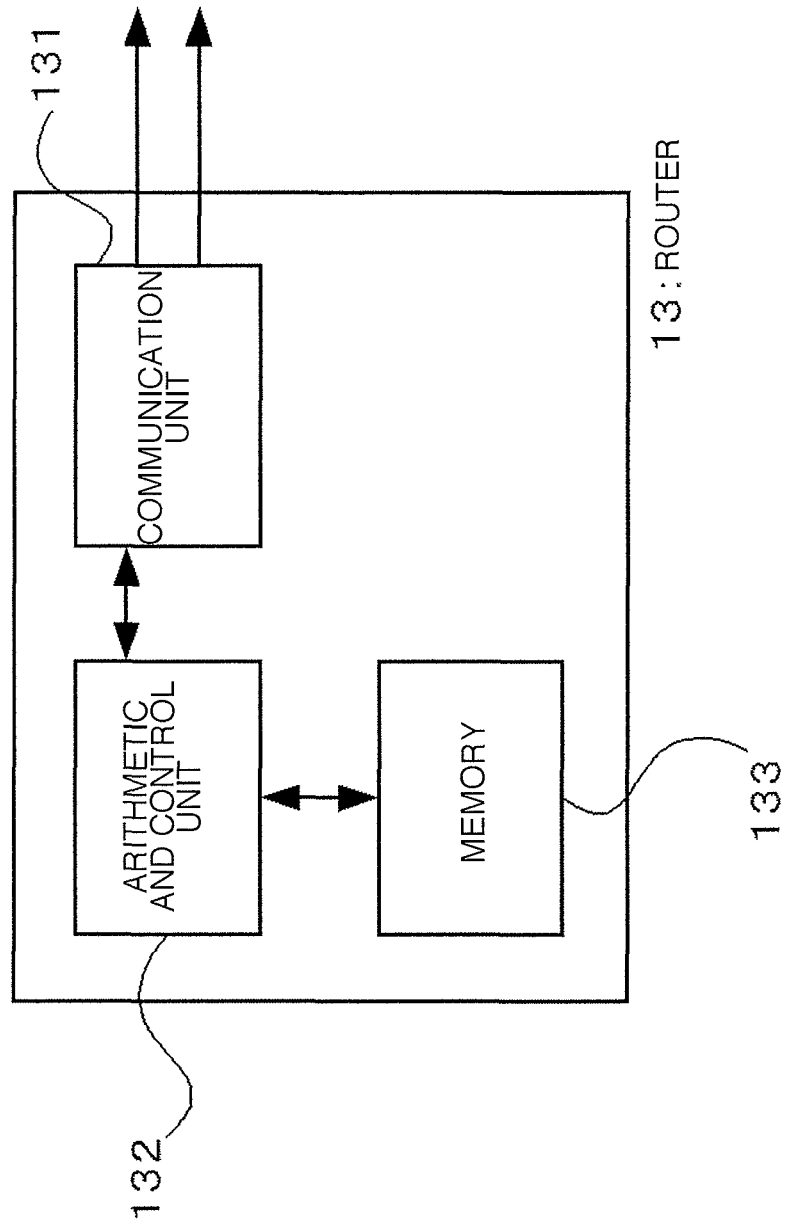
FIG. 7 is a configuration block diagram of a router 13 shown in FIG. 1.

FIG. 7 is a configuration block diagram of the router 13 shown in FIG. 1. In FIG. 7, a communication unit 131 is connected to an arithmetic and control unit 132, and the arithmetic and control unit 132 is connected to a memory 133. The communication unit 131 has a plurality of communication interfaces (not shown) (for example, communication interfaces IF130, IF131, and so forth), executing communication mainly with the tunneling device 12, and the router 14, respectively. The arithmetic and control unit 132 is comprised mainly of a CPU and so forth, controlling operations of the respective units. The memory 133 stores OS, a program for running the router, routing-information, various information pieces, and so forth. The routers 14, 15, and 18 to 21 are each similarly made up.

Further, an operation for transmitting, for example, a clockwise packet and receiving a counterclockwise packet, and an operation for transmitting, for example, a counterclockwise packet and receiving a clockwise packet are assigned to each of the plurality of the communication interfaces of the communication unit.

Figure 8:
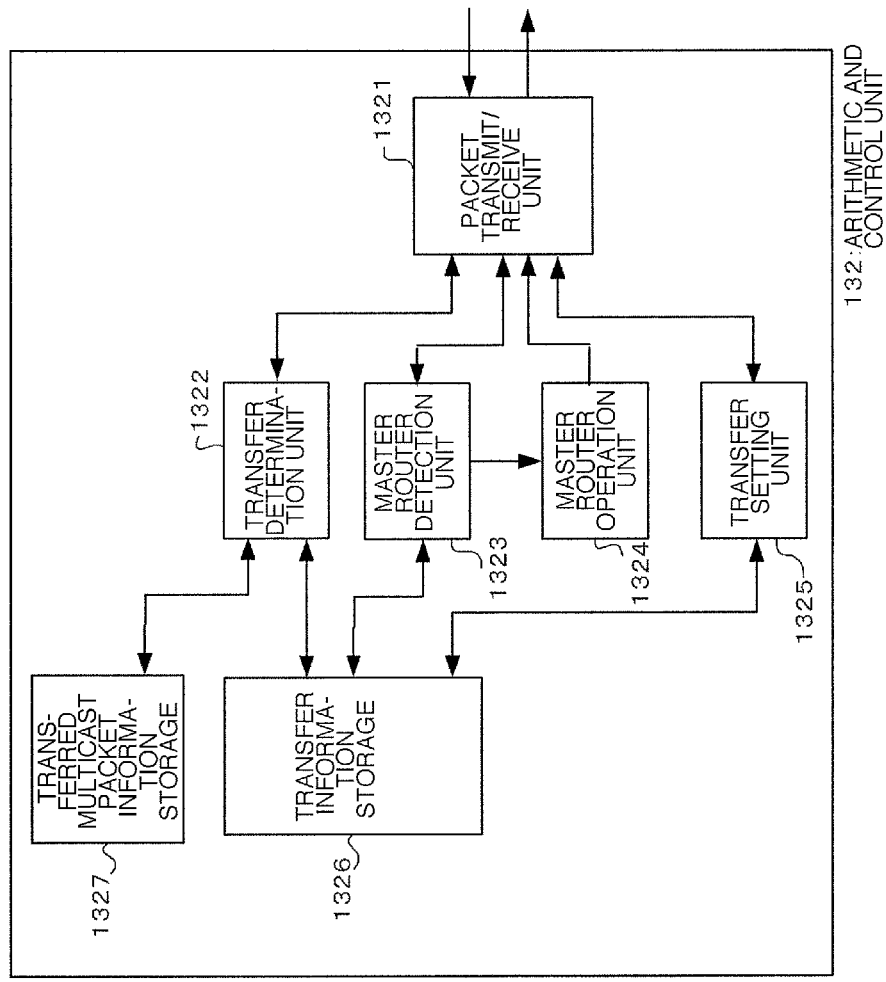
FIG. 8 is a view showing an example of a functional block diagram of an arithmetic and control unit 132 as a constituent of the router 13 shown in FIG. 7.

FIG. 8 is a view showing an example of a functional block diagram of the arithmetic and control unit 132 as a constituent of the router 13 shown in FIG. 7. A packet transmit/receive unit 1321 executes transmit/receive of a packet such as a tunneling packet, in the main, and so forth. A transfer determination unit 1322 determines in which direction a tunneling packet received mainly from the tunneling device 12 is to be transferred, the clockwise direction, or in the clockwise direction. A master-router detection unit 1323 executes search•detection of a master-router. A master router operation unit 1324 operates the router 13 itself as the master-router.

A transfer setting unit 1325 sets operations of the respective communication interfaces in the communication unit of the router 13 itself, transmitting "a direction-deciding packet" for use in setting•sharing of a transfer-direction of a packet in a ring network to other routers. A transfer-information storage 1326 stores the routing-information toward hosts, and other routers, transfer-information including respective network addresses of a router, and tunneling device, for use in transferring the clockwise packet, and the counterclockwise packet, and setting information for setting the operations of the respective communication interfaces in the communication unit, and "ring network information" such as the master router of a ring network to which the router 13 itself is connected, the transfer destination, and so forth.

The transfer-information stored in the transfer-information storage 1326 includes interface names of the respective communication interfaces, and information for use in defining whether the respective communication interfaces transmit, or receive the clockwise packet and the counterclockwise packet. The transfer-information includes information specifying that, for example, an interface name "IF-RIGHT" is set to an interface for transmitting the clockwise packet, and an interface name "IF-LEFT" is set to an interface for transmitting the counterclockwise packet. In such a case, it follows that the clockwise packet is received by IF-LEFT to be transferred from IF-RIGHT, and the counterclockwise packet is received by IF-RIGHT to be transferred from IF-LEFT.

The transfer determination unit 1322 analyzes the tunneling packet which the packet transmit/receive unit 1321 has received from the respective routers before storing "the transferred packet information", such as the tunneling start-point address, the end-point multicast address, the packet ID, and so forth, in a transferred multicast packet information storage 1327.

Figure 9:
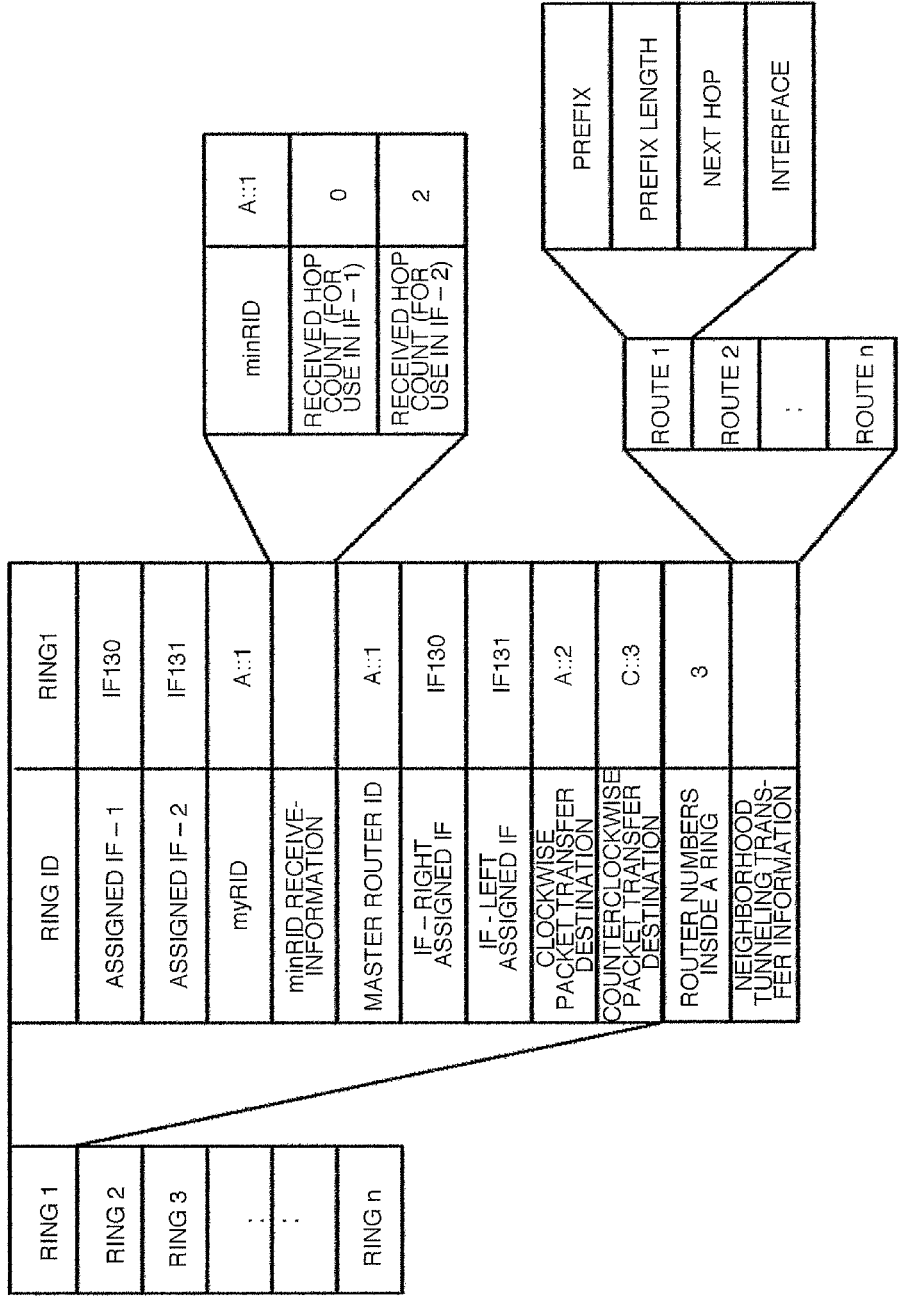
FIG. 9 is a schematic representation showing an example of ring network information stored in a transfer-information storage 1326 of each of the routers.

FIG. 9 is a schematic representation showing an example of transfer-information of the ring network information stored in the transfer-information storage 1326 of each of the routers. As shown in FIG. 9, in each of the routers 13 to 15, the transfer-information storage has a plurality of "ring" fields, that is, the transfer-information on the respective ring networks, the ring networks each being comprised of a plurality of the routers.

Those "ring" fields each comprise fields such as "ring ID" (for example, "RING1") where identification information on respective ring networks is stored, "assigned IF-1" (for example, "the communication interface IF130") where information on the first communication interface assigned to a ring network is stored, "assigned IF-2" (for example, "the communication interface IF131") where information on the second communication interface assigned to a ring network is stored, "myRID" for storing identification information on a router used in a ring network such as an address smallest in value among the IPv6 addresses, set to assigned IF-1, and IF-2, respectively, "minRID receive-information" for use in selection of the master router, where information on a router having identification information smallest in value within a ring network is stored, "master-router ID" (for example, "A:: 1") for storing identification information on the master-router, and so forth.

For a router ID (hereinafter referred to as RID), that is, identification information on each router, use is made of the IPv6 address assigned to the router. Further, in the case where a plurality of IPv6 addresses are assigned to a router, an IPv6 address having the smallest value is used as RID. However, RID may be optionally set by an operator.

Furthermore, the ring fields each has fields such as "IF-RIGHT assigned IF" (for example, "the communication interface IF130") where information on the communication interface to which "IF-RIGHT" for transmitting the clockwise packet is set, "IF-LEFT assigned IF" (for example, "the communication interface IF131") where information on the communication interface to which "IF-LEFT" for transmitting the counterclockwise packet is set, "clockwise packet transfer destination" (for example, the IPv6 address of the router 14: "A::2") where respective addresses of a router and a tunneling device, for transferring the clockwise packet, and so forth are stored, "counterclockwise packet transfer destination" (for example, the IPv6 address of the router 15: "C:: 3") where respective addresses of a router and a tunneling device, for transferring the counterclockwise packet, and so forth are stored, "router numbers inside a ring" where the number of the routers making up the relevant ring network is stored, "neighborhood tunneling-transfer information" where prefix information on the IPv6 address behind a neighborhood tunneling device connected to the router 13 itself, and tunneling information are stored, and so froth.

"The minRID receive-information" has fields such as "minRID" (for example, "A::1") where the identification information on a router having the smallest value, in the ring network recognized by this router, is stored, "received hop count" (for use in IF-1) (for example, "0") where the transfer times of an advertisement packet which the interface IF-1 has received is stored, "received hop count" (for use in IF-2) (for example, "2") where transfer times of the advertisement packet which the interface IF-2 has received is stored, and so forth.

"The neighborhood tunneling-transfer information" field has a plurality of "route" fields indicating routing-information on a prefix-by-prefix basis, the prefix serving as a tunneling target.

Further, those "route" fields each have fields such as "prefix" where the prefix of the IPv6 address to be transferred to a tunneling device is stored, "prefix length" where a prefix length is stored, "next hop" where a link local address of a tunneling device to which a packet addressed to the relevant prefix should be transferred is stored, "interface" where an identifier of an interface connected to a network of the next hop router is stored, and so forth.

Herein, the advertisement packet is a packet for notifying minRID (the identification information on the router smallest in value, within the ring network recognized by respective routers) stored in the transfer-information storage 1326 in order to select the master-router out of respective routers making up a ring network, and a router having identification information with the smallest value within the ring network is selected as the master-router.

Figure 10:
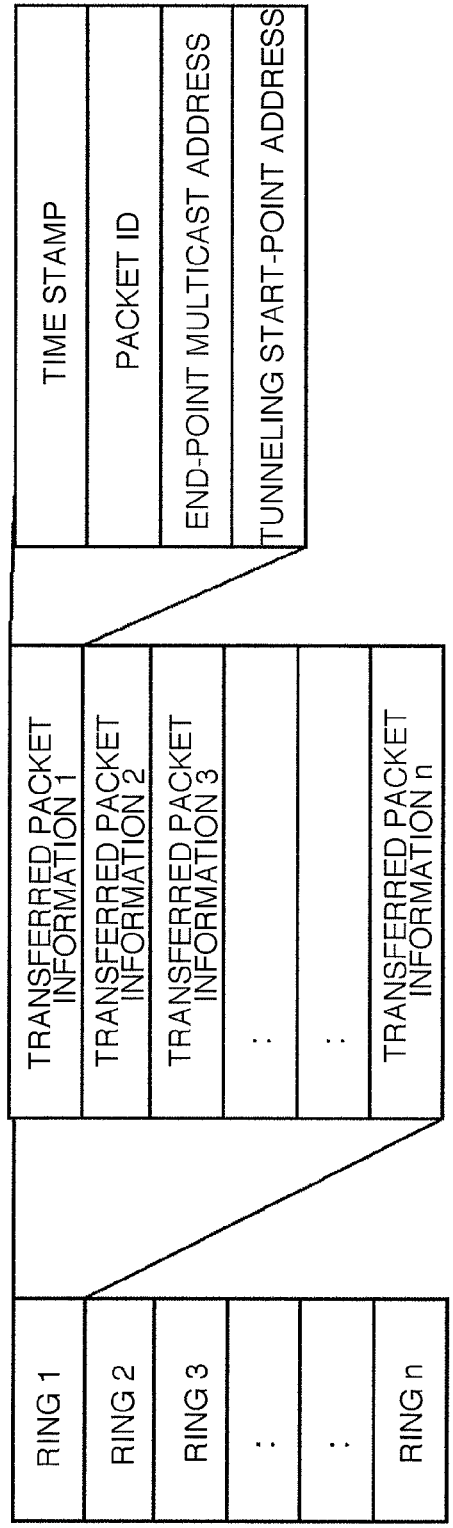
FIG. 10 is a schematic representation showing an example of transferred multicast packet information stored in a transferred multicast packet information storage (for example, one denoted by reference numeral 1327) of each of the routers.

FIG. 10 is a schematic representation showing an example of transferred multicast packet information stored in the transferred multicast packet information storage (for example, one denoted by reference numeral 1327) of each of the routers. As shown in FIG. 10, in each of the routers 13 to 15, the transferred multicast packet information storage has "ring" fields indicating a ring network where the relevant packet belongs.

Those "ring" fields each have a plurality of "transferred packet information pieces", each piece representing an entry for every transferred tunneling packet. "The transferred packet information piece" comprises time stamp where a time when a tunneling packet is received is stored, "packet ID" where an identifier of the tunneling packet is stored, "endpoint multicast address" where an end-point multicast address of the tunneling packet as received is stored, "tunneling start-point address" where a start-point address of the tunneling packet as received is stored, and so forth.

Since the routers each can have not less than two communication-interfaces, each of the routers can join no less than one ring network, in which case, information necessary for transfer will differ on a ring-by-ring basis, so that each of the routers has not less than one "ring" field.

Figure 11:
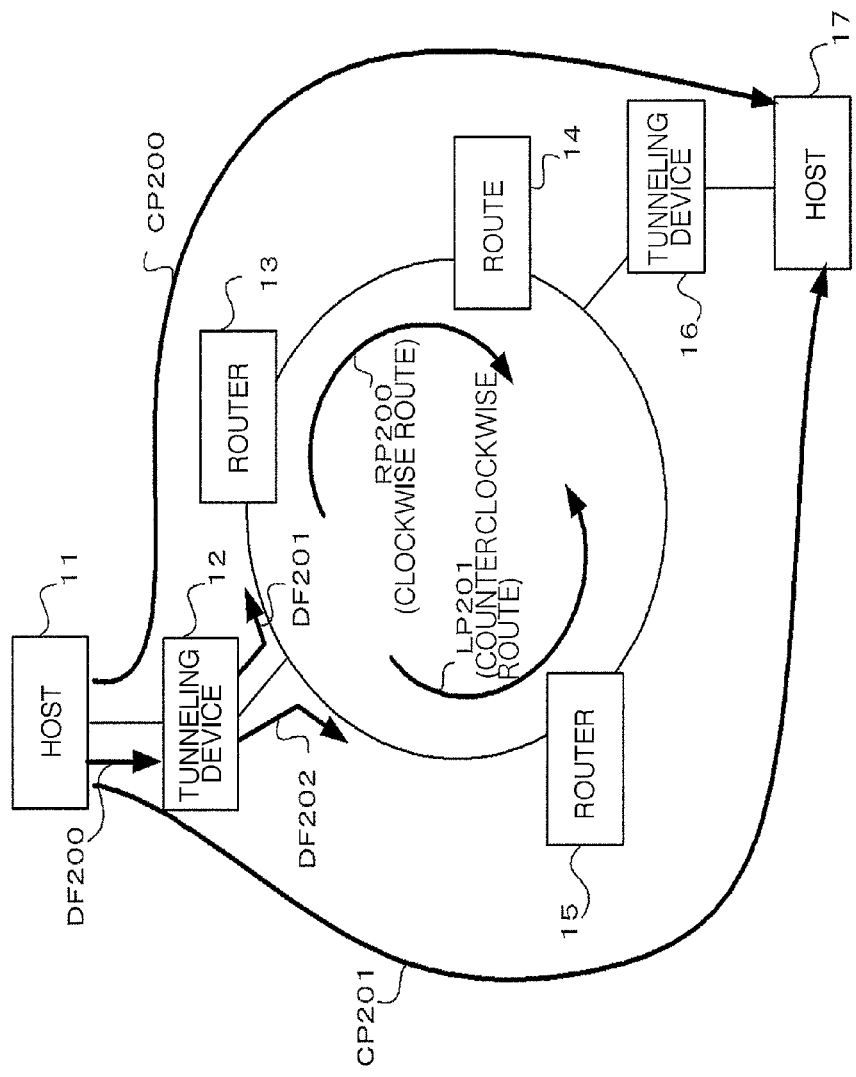
FIG. 11 is a schematic representation showing packet communication flows with reference to the operation of the IP network system according to the present invention.

Now, the operation of the IP network system according to the present invention is described hereinafter with reference to a schematic representation of FIG. 11, showing packet communication flows, an operation flow chart of FIG. 12, and FIGS. 13 to 15, each showing an example of a packet format for use in the IP network system. In FIG. 12, reference numeral (A) indicates an operation flow chart in the case where a tunneled packet is transmitted by unicast transmission, and reference numeral (B) indicates an operation flow chart in the case where a tunneled is transmitted by multicast transmission. Further, for brevity in description, there is described the case of an operation whereby packet communication is executed between the hosts 11, 17 through the intermediary of the first ring network RING1 comprised of the routers 13 to 15.

In FIG. 11, packet communication DF200 shows a flow whereby the host 11 transmits a packet to the tunneling device 12, packet communication DF201 shows a flow whereby the tunneling device 12 transmits a packet to the router 13, packet communication DF202 shows a flow whereby the tunneling device 12 transmits a packet to the router 15, a communication route CP200 shows a flow whereby a packet from the host 11 reaches the host 17 via the tunneling device 12, the routers 13, 14, and the tunneling device 16, and a communication route CP201 shows a flow whereby a packet from the host 11 reaches the host 17 via the tunneling device 12, the router 15, and the tunneling device 16.

Figure 12A:
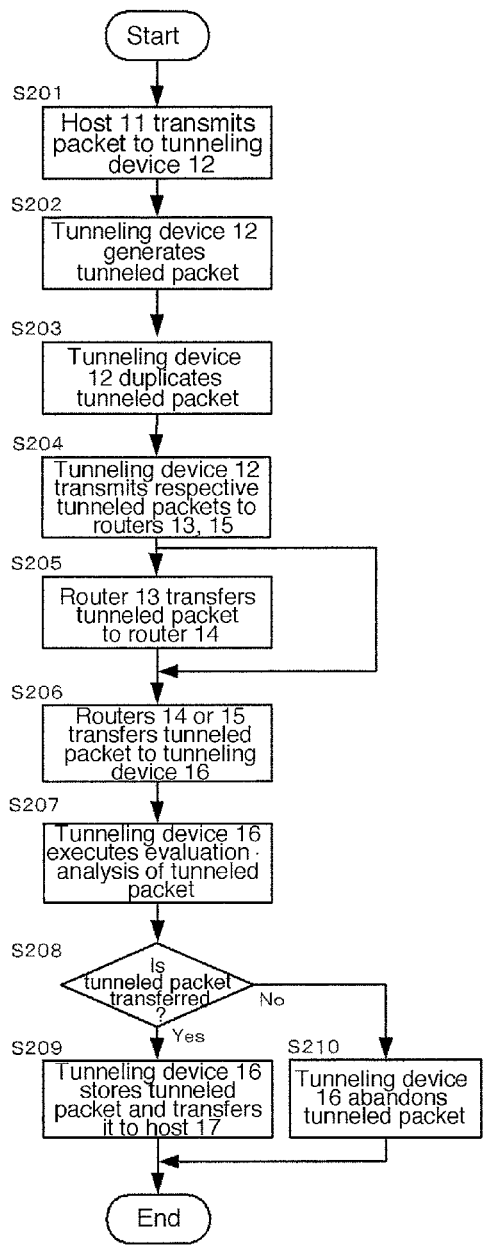
FIG. 12 is an operation flow chart describing the operation of the IP network system according to the present invention.

<<Operation Flow of FIG. 12(A), Wherein a Tunneled Packet is Transmitted by Unicast Transmission>>

There is described hereinafter an operation whereby a tunneled packet reaches a host at a transmission destination by unicast transmission via respective routes leftward-bound and rightward-bound, respectively, in the IP network system according to the present invention.

In step S201 shown in FIG. 12(A), an arithmetic and control unit (not shown) of the host 11 activates OS stored in a memory (not shown), and so forth, and reads a program on the OS before running the program to thereby control the host 11 in whole while generating a packet containing measurement data indicating that the final destination is the host 17, thereby controlling a communication unit before transmitting the packet to the tunneling device 12. The host 11 transmits the packet (for example, a packet P10 in FIG. 11) to the tunneling device 12 as shown by the flow of, for example, the packet communication DF200 in FIG. 11.

Figure 13:
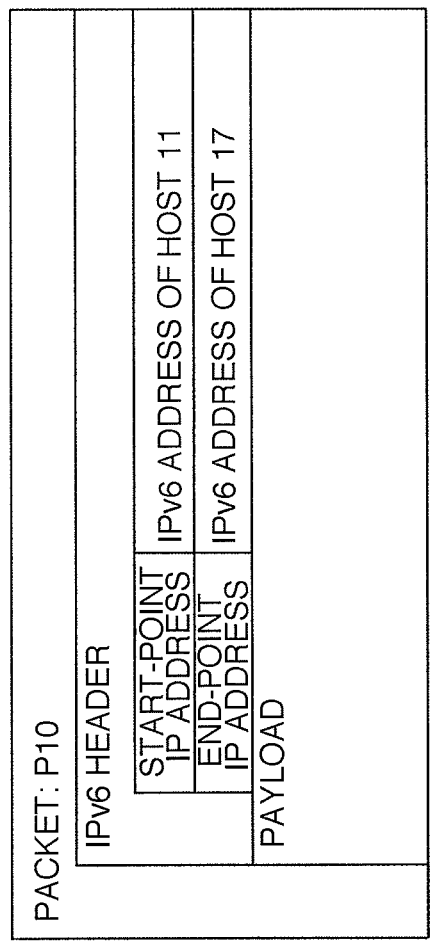
FIG. 13 is a view showing an example of a packet format for use in the IP network system.

FIG. 13 is a schematic representation showing an example of packet format of the packet P10 generated by the host 11. The packet P10 has fields such as an IPv6 header, payload, and so forth while a start-point IP address value (for example, "the IPv6 address of the host 11"), and an end-point IP address value (for example, the IPv6 address of the host 17) are set to the IPv6 header, and data such as application data, and so forth is stored in the payload.

In step S202, the arithmetic and control unit 122 of the tunneling device 12 activates an OS stored in the memory 123, and so forth, reading a program stored on the OS before running the program to thereby control the tunneling device 12 in whole, and the tunneling device 12 applies encapsulation processing to the packet from the host 11, thereby generating a tunneled packet. In this connection, since the operation of the arithmetic and control unit 122 of the tunneling device 12, for reading the program stored in the memory 123, and running the program to thereby control the respective units is applied to other tunneling devices as well, description thereof is omitted hereinafter.

The tunneling packet generation unit 1222 of the arithmetic and control unit 122 retrieves "the tunneling end-point address" (for example, the IPv6 address of the tunneling device 16) of tunneling communication for use between the tunneling device 12 and the host 17 at the transmission destination on the basis of, for example, the packet P10 from the host 11, and the tunneling-preparation information (for example, "route 1" in FIG. 4), adding the tunneling end-point address to the packet P10 to thereby generates a tunneling packet P20. Furthermore, the tunneling packet generation unit 1222 prepares "the packet ID" (for example, "PKT0") serving as the tunneling packet identifier to be added to the tunneling packet P20.

Figure 14:
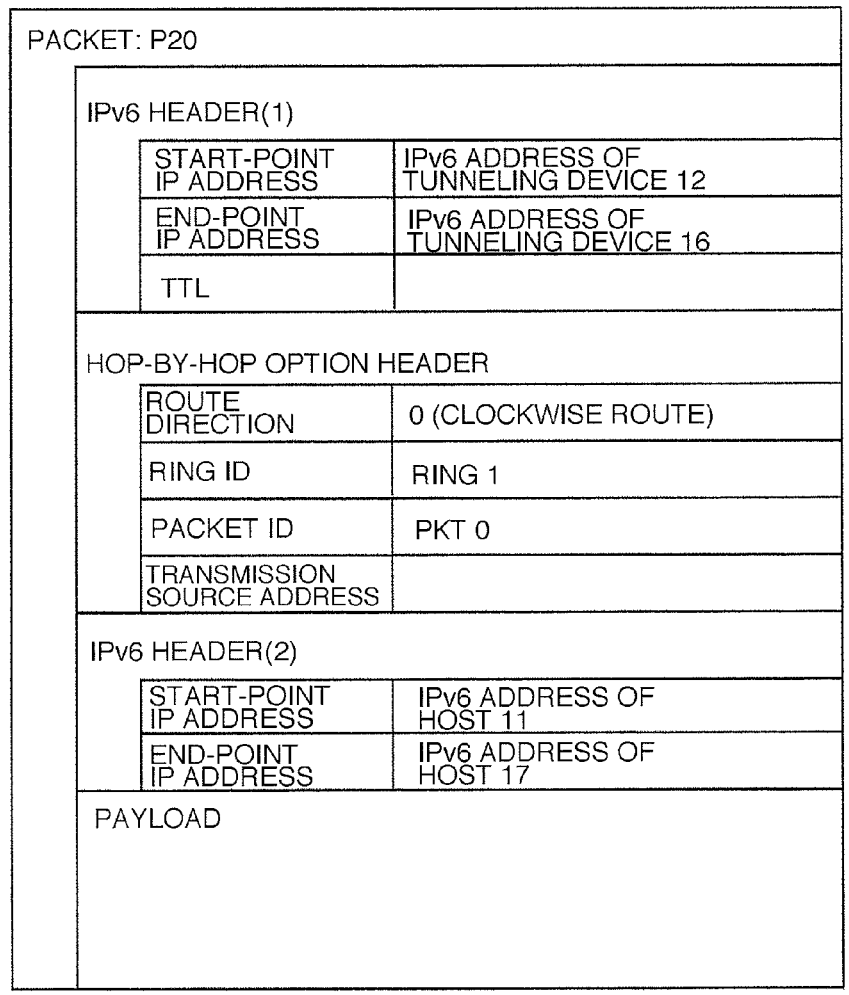
FIG. 14 is a view showing an example of another packet format for use in the IP network system.

FIG. 14 is a schematic representation showing an example of a format of the tunneling packet P20 generated by the tunneling packet generation unit 1222. The tunneling packet P20 is the packet P10 shown in FIG. 13, with IPv6 header (1), hop-by-hop option header, and destination option header, added thereto.

The IPv6 header (1) has fields such as "start-point IP address" where an address of the tunneling device at a transmission source is stored, "end-point IP address" where an address of the tunneling device at a transmission destination is stored, and so forth. The hop-by-hop option header has fields such as "route direction" where the clockwise direction, and counterclockwise direction, in a ring network, are stored, and "ring ID" where the identifier of a ring network is stored. The destination option header has "packet ID" field where the identifier of a tunneling packet is stored. Further, in FIG. 14, an IPv6 header of the packet P10 in the packet P20 is shown as an IPv6 header (2).

More specifically, on the basis of the packet P10, and the tunneling-preparation information, as shown in FIG. 14, the tunneling packet generation unit 1222 generates the tunneling packet P20 wherein there are set a value of the start-point IP address of the IPv6 header (1) (for example, "the IPv6 address of the tunneling device 12"), a value of the end-point IP address (for example, "the IPv6 address of the tunneling device 16"), a TTL (Time To Live) value representing the number of routers making up a ring, a value of the route direction of the hop-by-hop option header (for example, "0 packet information storage (clockwise)"), the ring ID (for example, "RING1"), and a value (for example, "PKT0") of the packet ID of the destination option header.

In step S203, the packet duplication unit 1224 of the arithmetic and control unit 122 of the tunneling device 12 duplicates a tunneling packet (for example, a tunneling packet P21, shown in FIG. 15,) on the basis of the tunneling packet as generated (for example, the tunneling packet P20, shown in FIG. 14), and the tunneling-preparation information.

Figure 15:
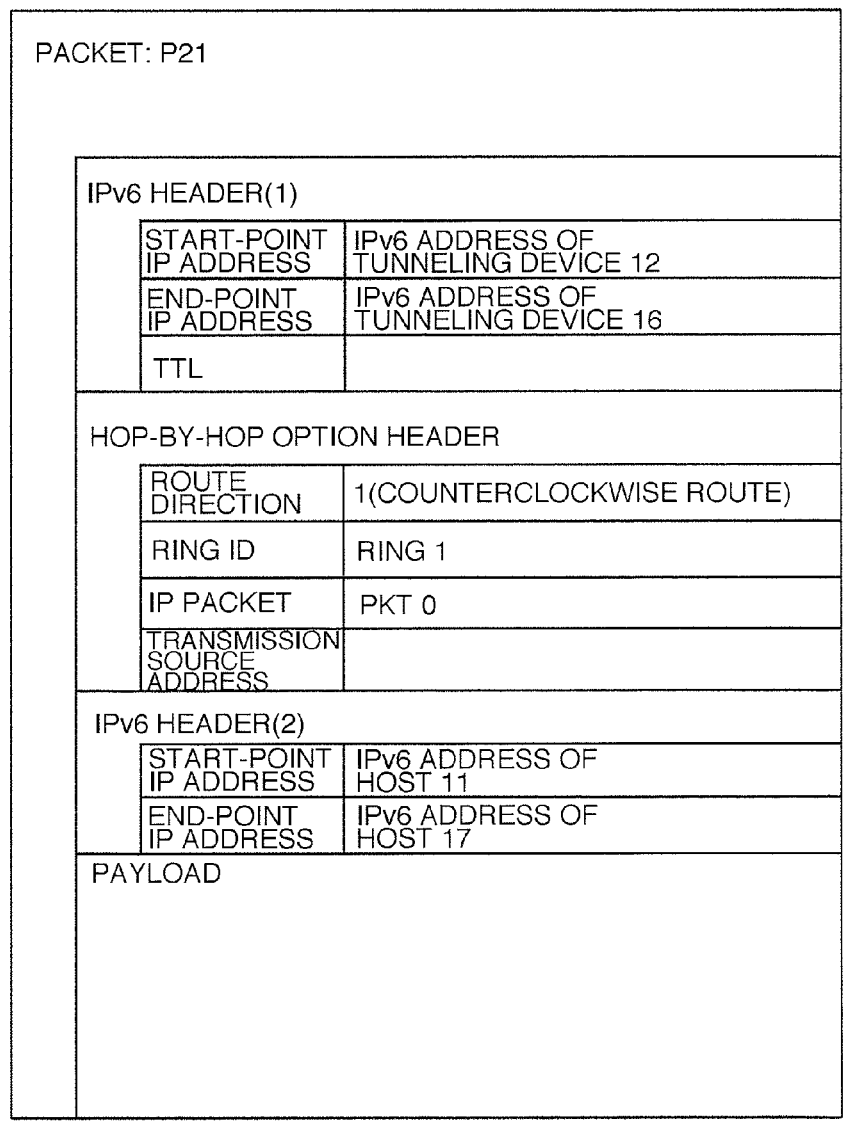
FIG. 15 is a view showing an example of still another packet format for use in the IP network system.

Upon duplication of the tunneling packet, the tunneling packet generation unit 1222 sets a value of the route direction of the hop-by-hop option header, as in the case of, for example, the tunneling packet P21 shown in FIG. 15, to a direction (for example, "1 (counterclockwise)") opposite to the route direction (for example, "0 (clockwise)") of the tunneling packet at a duplication source (for example, the tunneling packet P20 in FIG. 14).

In step S204, the packet transmit/receive unit 1221 of the arithmetic and control unit 122 of the tunneling device 12 transmits the respective tunneling packets to the routers 13, 15 on the basis of the ring ID, route direction, and end-point IP address, set in the respective tunneling packets, together with the tunneling packet preparation information stored in the memory 123.

More specifically, the packet transmit/receive unit 1221 of the tunneling device 12 retrieves routing-information on RING1 in the tunneling packet preparation information on the basis of the ring ID (RING1), set in the tunneling packets P20, P21, respectively.

Then, the packet transmit/receive unit 1221 transmits the tunneling packet P20 to the router 13, and the tunneling packets P21 to the router 15 on the basis of, for example, the "clockwise packet transfer destination" (the address of the router 13: "C::1"), in the routing-information of FIG. 4, the counterclockwise packet transfer destination (the address of the router 15: "C::3"), the route direction of the tunneling packet P20 (clockwise), the route direction of the tunneling packet P21 (counterclockwise), and the end-point IP address (for example, the IPv6 address of the tunneling device 16).

Now, since the operation of the arithmetic and control unit 122 of the tunneling device 12, for reading the program stored in the memory 123, and running the program to thereby control the respective units is applicable to other tunneling devices as well, description thereof is omitted hereinafter. In the case of the tunneling device 12 having transferred the tunneling packet to the router 13, the operation proceeds to step S205 while proceeding to step S206 in the case of the tunneling device 12 having transferred the tunneling packet to the router 15.

In step S205, the arithmetic and control unit 132 of the router 13 activates OS stored in the memory 133, and so forth, and reads a program on the OS before running the program to thereby control the router 13 in whole, whereupon the router 13 transfers the tunneling packet received from the tunneling device 12 to the router 14 on the basis of the route direction as well as the end-point IP address of the tunneling packet, and the transfer-information of the transfer-information storage 1326.

More specifically, the router 13 receives the tunneling packet P20 via the IF-LEFT assigned IF 131 of the communication unit 131. And the transfer determination unit 1322 of the arithmetic and control unit 132 controls the IF-RIGHT assigned IF130 on the basis of the route direction of the tunneling packet P20 (for example, clockwise), the end-point IP address (for example, the IPv6 address of the tunneling device 16), and the clockwise-packet transfer destination of the transfer information (for example, the address of the router 14 "A::2", thereby transferring the tunneling packet (for, example, P20) received from the tunneling device 12 to the router 14.

In this connection, since the operation of the arithmetic and control unit 132 of the router 13, for reading a program stored in the memory 133, and running the program to thereby transfer the tunneling packet is applied to other routers as well, description thereof is omitted hereinafter.

In step S206, a transfer determination unit of an arithmetic and control unit (not shown) of the router 14, or the router 15 transfers the tunneling packet received from either the router 13, or the tunneling device 12 to the tunneling device 16 on the basis of the value of the route direction header of the tunneling packet as received (for example, the tunneling packet P20, or P21), the end-point IP address (for example, the IPv6 address of the tunneling device 16), and transfer information pre-stored in a transfer-information storage (not shown), including the clockwise-packet transfer destination, and the counterclockwise-packet transfer destination.

Thus, the tunneling packet transmitted from the tunneling device 12 is transferred to the tunneling device 16 through the intermediary of the ring network comprised of the routers 13 to 15.

Incidentally, the tunneling device 16 receives the tunneling packet P20 transmitted from the router 14 ahead of the tunneling packets P21 transmitted from the router 15.

In step S207, the tunneling-receive processor of the arithmetic and control unit of the tunneling device 16 executes evaluation•analysis of the tunneling packet (for example, the tunneling packet P20) received via the router 13, 14, or 15.

In step S208, the transfer determination unit determines whether or not the tunneling packet (for example, the tunneling packet P20) subjected to the evaluation•analysis has been transferred to the router 17 on the basis of the transferred packet information stored in the packet information storage. If the transferred packet received by the tunneling device 16 has not been transferred to the router 17 as yet, the operation proceeds to step S209.

The transfer determination unit of the tunneling device 16 determines that the transferred packet received by the tunneling device 16 has not been transferred to the router 17 as yet if tunneling packets identical to each other are not found stored in the packet information storage with the aid of the start-point address (for example, the host 11) of, for example, a tunneling packet (for example, P20), and the packet ID (for, example, PKT0) of the destination option header.

In step S209, the tunneling-receive processor of the arithmetic and control unit of the tunneling device 16 analyzes the tunneling packet received via the routers 13, 14, or the router 15, thereby storing, for example, data transmitted from the host 11, stored in the payload of the tunneling packet, the start-point IP address of IPv6 header (1) (for example, the IPv6 address of the tunneling device 12), the value of the packet ID (for, example, "PKT0") of the destination option header, the time when the tunneling packet is received, and so forth in the packet information storage. The packet generation unit removes tunneling headers such as the IP header, the expansion header, and so forth from the tunneling packet to thereby generate a packet identical in makeup to the packet (for example, the packet P10) transmitted from the host 11. The packet transmit/receive unit transfers the packet to the host 17.

Meanwhile, it is assumed that the tunneling device 16 has received the tunneling packet P21 after having transferred the tunneling packet P20. More specifically, if the tunneling packet information (for example, the start-point address of the tunneling packet P20, and the packet ID of the destination option header) identical to that of the tunneling packet P21 is stored in the packet information storage, the tunneling device 16, in step S207, determines that the tunneling packet as received (for example, P21) has already been transferred to the host 17, whereupon the operation proceeds to step S210. In step S210, the packet-abandoning unit of the arithmetic and control unit of the tunneling device 16 abandons the tunneling packet as received (for example, P21).

With the adoption of such a configuration as described, the respective repeaters, such as the routers, tunneling devices, and so forth, apply the encapsulation processing to packets received from a host at the transmission source to thereby duplicate the tunneling packets, and transmit the respective tunneling packets to the ring network comprised of the plurality of the repeaters through the unicast transmission in the clockwise direction, and the counterclockwise direction, respectively, whereupon the respective repeaters transfer the received tunneling packets in the clockwise direction, and the counterclockwise direction, respectively. Since the duplicated tunneling packets each will not concurrently pass through the same repeater, the packet can reach the transmission destination with reliability even if a trouble occurs to any of the routes.

Figure 12B:
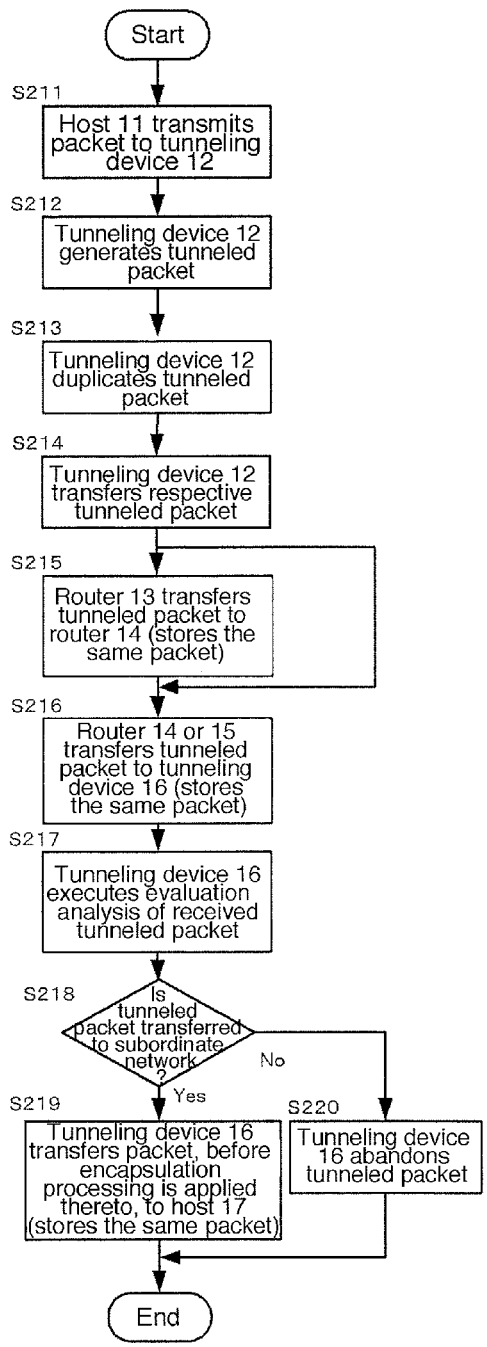

<<Operation Flow of FIG. 12(B), Wherein a Tunneling Packet is Transmitted by Multicast Transmission>>

There is described hereinafter an operation whereby a tunneling packet reaches a host at a transmission destination by multicast transmission via respective routes leftward-bound and rightward-bound, respectively, in the IP network system according to the present invention.

In step S211 shown in FIG. 12(B), the arithmetic and control unit of the host 11 activates the OS stored in the memory, and so forth, and reads the program on the OS before running the program to thereby control the host 11 in whole while generating a packet containing measurement data indicating that the final destination is a multicast address where the host 17 belongs, thereby controlling the communication unit before transmitting the packet to the tunneling device 12.

The host 11 transmits the packet (for example, the packet P10 in FIG. 13) to the tunneling device 12 as shown by the flow of, for example, the packet communication DF200 in FIG. 11.

In step S212, the arithmetic and control unit 122 of the tunneling device 12 activates the OS stored in the memory 123, and so forth, reading the program stored on the OS before running the program to thereby control the tunneling device 12 in whole, and the tunneling device 12 applies the encapsulation processing to the packet from the host 11, thereby generating the tunneling packet. In this connection, since the operation of the arithmetic and control unit 122 of the tunneling device 12, for reading the program stored in the memory 123, and running the program to thereby control the respective units is applicable to other tunneling devices as well, description thereof is omitted hereinafter.

The tunneling packet generation unit 1222 of the arithmetic and control unit 122 retrieves a transmission-destination multicast address where the host 17 belongs, on the basis of, for example, the packet P10 from the host 11, the tunneling-preparation information (for example, "route 1" in FIG. 4), and the transfer-target multicast information storage 1231, adding the transmission-destination multicast address as the tunneling end-point address thereof to the packet P10 to thereby generates a tunneling packet P20' (not shown). Furthermore, the tunneling packet generation unit 1222 prepares the packet ID (for example, "PKT0") serving as the tunneling packet identifier to be added to the tunneling packet P20'. Further, since the format of the packet P20' generated by the tunneling packet generation unit 1222 is the same as that of the tunneling packet P20 in FIG. 14 except that the tunneling end-point address of the IPv6 header (1) is the multicast address where the host 17 belongs, description thereof is omitted.

In step S213, the packet duplication unit 1224 of the arithmetic and control unit 122 of the tunneling device 12 duplicates a tunneling packet (for example, a tunneling packet P21') on the basis of the tunneling packet as generated (for example, the tunneling packet P20'), and the tunneling-preparation information.

Upon duplication of the tunneling packet, the tunneling packet generation unit 1222 sets a value of the route direction of the hop-by-hop option header, as in the case of, for example, the tunneling packet P21', to a direction (for example, "1 (counterclockwise)") opposite to the route direction of the tunneling packet at the duplication source (for example, the tunneling packet P20'). Further, since the tunneling packet P21' as well is the same in format as the tunneling packet P21 in FIG. 15 except that the tunneling end-point address of the IPv6 header (1) is the multicast address where the host 17 belongs, description thereof is omitted.

In step S214, the packet transmit/receive unit 1221 of the arithmetic and control unit 122 of the tunneling device 12 transmits the respective tunneling packets to a ring network (transmitted to the IF-LEFT assigned interface IF of the router 13, and the IF-RIGHT assigned interface IF of the router 15) on the basis of the ring ID, route direction, and end-point IP address (the multicast address), set in the respective tunneling packets, together with the tunneling packet preparation information stored in the memory 123.

More specifically, the packet transmit/receive unit 1221 of the tunneling device 12 retrieves the routing-information on RING1 in the tunneling packet preparation information on the basis of the ring ID (RING1), set in the tunneling packets P20', P21', respectively, thereby transmitting the tunneling packets P20' to the router 13, and the tunneling packets P21' to the router 15.

Now, since the operation of the arithmetic and control unit 122 of the tunneling device 12, for reading the program stored in the memory 123, and running the program to thereby control the respective units is applicable to other tunneling devices as well, description thereof is omitted hereinafter. In the case of the tunneling device 12 having transferred the tunneling packet to the router 13, the operation proceeds to step S215 while proceeding to step S216 in the case of the tunneling device 12 having transferred the tunneling packet to the router 15.

In step S215, the arithmetic and control unit 132 of the router 13 activates the OS stored in the memory 133, and so forth, and reads the program on the OS before running the program to thereby control the router 13 in whole, whereupon the router 13 transfers the tunneling packet received from the tunneling device 12 to the router 14 on the basis of the route direction, hop count, and the end-point IP address, as for the tunneling packet, and the transfer-information of the transfer-information storage 1326. Further, the router 13 stores the start-point address as well as the end-point multicast address of the IPv6 header of a transferred tunneling packet, and the packet ID of the hop-by-hop option header in the transferred multicast packet information storage 1327.

Further, in step S215, the router 13 evaluates the start-point address as well as the end-point multicast address of the IPv6 header of a received packet from the tunneling device 12, and the packet ID of the destination option header thereof, comparing the received packet with information stored in the transferred multicast packet information storage, and if a packet identical to the relevant packet is found already processed, the packet is abandoned.

More specifically, the router 13 receives the tunneling packet P20' via the IF-LEFT assigned IF131, and compares the same with packet information stored in the transferred multicast packet information storage, determining whether or not a packet identical thereto has already been processed. Assuming that the packet is not yet to be processed, the transfer determination unit 1322 of the arithmetic and control unit 132 of the router 13 controls the IF-RIGHT assigned IF130 on the basis of the route direction (for example, clockwise direction) of the tunneling packet P20', the end-point IP address, and the clockwise-packet transfer destination interface, thereby transferring the tunneling packet (for example, tunneling packet P20') received from the tunneling device 12 to the router 14.

In this connection, since the operation of the arithmetic and control unit 132 of the router 13, for reading the program stored in the memory 133, and running the program to thereby control the respective units is applicable to other routers as well, description thereof is omitted hereinafter.

In step S216, the transfer determination unit of the arithmetic and control unit (not shown) of the router 14, or the router 15 transfers the tunneling packet received from either the router 13, or the tunneling device 12 to the tunneling device 16 via an interface on the opposite side of a receiving interface on the basis of the value of the route direction header of the tunneling packet as received (for example, the tunneling packet P20', or P21'), the end-point IP address, and transfer information pre-stored in a transfer-information storage (not shown), such as IF-RIGHT assigned IF" and "IF-LEFT assigned IF. Further, the router 14, or the router 15 stores the start-point address as well as the end-point multicast address of the IPv6 header of the transferred tunneling packet, and the packet ID of the hop-by-hop option header in the transferred multicast packet information storage.

Further, in step S216 as well, the router 14, or the router 15 evaluates the start-point address as well as the end-point multicast address of the IPv6 header of the received packet from the tunneling device 12, and the packet ID of the hop-by-hop option header thereof, comparing the received packet with information stored in the transferred multicast packet information storage, and if the packet identical to the relevant packet is found already processed, the packet is abandoned.

Thus, the tunneling packet transmitted from the tunneling device 12 is transferred to the tunneling device 16 through the intermediary of the ring network comprised of the routers 13 to 15.

Incidentally, the tunneling device 16 receives the tunneling packet P20' transmitted from the router 14 ahead of the tunneling packets P21' transmitted from the router 15.

In step S217, the tunneling-receive processor of the arithmetic and control unit of the tunneling device 16 executes evaluation•analysis of the tunneling packet (for example, the tunneling packet P20') received via the router 13, 14, or 15.

If the tunneling device 16 has not transferred the received tunneling packet as yet, the tunneling device 16 transfers the received tunneling packet. If the received tunneling packet has already been transferred, the operation proceeds to step S218 as follows.

Herein, explanation is given by taking the tunneling device 16 as an example, however, assuming that a router as a constituent of the ring network has the function of the tunneling device 16, the transfer determination unit of the router determines whether or not the tunneling packet (for example, the tunneling packet P20') subjected to the evaluation analysis has been transferred to a router connected to an interface on the opposite side of the interface having received the tunneling packet on the basis of the transferred packet information stored in the packet information storage.

If it is found with the aid of, for example, the start-point address (for example, the tunneling device 12) of the tunneling packet (for example, P20'), and the packet ID (for example, PKT0) of the hop-by-hop option header that tunneling packets identical to each other are not stored in the packet information storage, it is determined that the tunneling packet has not been transferred to the router on the opposite side of the interface as yet.

In the case where the tunneling packet received by the router has not been transferred to the router on the opposite side of the interface as yet, transfer of the tunneling packet is executed. In the case where the tunneling packet received by the router has already been transferred to the router on the opposite side of the interface, the operation proceeds to step S218 as follows. Further, such determination on whether or not the tunneling packet has been transferred as described herein may be omitted. In such a case, the packet as transferred in both directions undergoes circling around the ring network once upon TTL turning "0" to be subsequently abandoned.

In step S218, the transfer determination unit determines whether or not the tunneling packet (for example, the tunneling packet P20') subjected to the evaluation•analysis in step S217 has been transferred to a subordinate network (the network where the router 17 belongs) or not on the basis of the transferred packet information stored in the packet information storage. If the transferred packet received by the tunneling device 16 has not been transferred to the subordinate network as yet, the operation proceeds to step S219.

If it is found with the aid of, for example, the start-point address (for example, the tunneling device 12) of the tunneling packet (for example, P20'), and the packet ID (for example, PKT0) of the hop-by-hop option header that the tunneling packets identical to each other are not stored in the packet information storage, the transfer determination unit of the tunneling device 16 determines that the tunneling packet has not been transferred to the subordinate network as yet.

In step S219, the tunneling-receive processor of the arithmetic and control unit of the tunneling device 16 executes analysis on the tunneling packet P20 received via the router 13, 14, or 15 to check if a receiver of the multicast address of the tunneling packet exists behind a device of its own (the tunneling device 16). If so, the tunneling device 16 extracts the tunneling packet P10 to be transferred to a network behind the tunneling device 16.

Now, the tunneling devices each control a multicast address where their own subordinate nodes belong, and a transmission source address thereof, in pairs, although not shown in figures. The transmission source address is set in the case where a node belonging thereto explicitly designates a transmission source (Source Specific Multicast). The tunneling devices each compare a multicast address with the endpoint address of a packet, and compare a transmission source address with the transmission source address of the hop-by-hop option header. If a node belonging to the transmission source address wants to designate a transmission source, all transmission source addresses match each other.

For example, data transmitted from the host 11, stored in the payload of a tunneling packet, the start-point address of the IPv6 header (1) (for example, the IPv6 address of the tunneling device 12), the destination address (multicast address), the value of the packet ID (for, example, "PKT0") of the hop-by-hop option header, the time when the tunneling packet is received, and so forth are stored in the packet information storage. The packet generation unit removes the tunneling headers such as the IP header, the expansion header, and so forth from the tunneling packet to thereby generate the packet identical in makeup to the packet (for example, the packet P10) received from the host 11. The packet transmit/receive unit transfers the packet to the subordinate network.

Meanwhile, it is assumed that the tunneling device 16 has received the tunneling packet P21' after transfer of the tunneling packet P20'. More specifically, if tunneling packet information (for example, the tunneling start-point address of the tunneling packet P20', the destination address (multicast address), and the packet ID of the hop-by-hop option header) identical to that on the tunneling packet P21' is stored in the packet information storage, the tunneling device 16 determines in step 218 that the received tunneling packet (for example, P21') has already been transferred to the host 17, whereupon the operation proceeds to step S220. In step S220, the packet-abandoning unit of the arithmetic and control unit of the tunneling device 16 abandons the received packet (for example, P21').

Further, if the router as a constituent of the ring network has the function of the tunneling device, the router executes the same operation as described above.

With the adoption of such a configuration as described, respective repeaters, such as the routers, tunneling devices, and so forth, apply the encapsulation processing to each of the packets received from the host at the transmission source and transmitted to a multicast address where the host at the transmission destination belongs by multicast transmission to thereby duplicate the tunneling packets, and transmit the respective tunneling packets to the ring network comprised of the plurality of the repeaters by the multicast cast transmission in the clockwise direction, and the counterclockwise direction, respectively, whereupon the respective repeaters transfer the received tunneling packets in the clockwise direction, and in the counterclockwise direction, respectively. Since the duplicated tunneling packets each will not concurrently pass through the same repeater, the packet cam reach the transmission destination with reliability even if a trouble occurs to any of the routes.

Even in the case where packet communication via the counterclockwise route LP201 shown in FIG. 1 is disabled due to a trouble having occurred to, for example, the router 15, the tunneling device 12 duplicates tunneling packets generated on the basis of the packet from the host 11, thereby transmitting duplicated tunneling packets in the counterclockwise direction, and in the clockwise direction, respectively, whereupon the routers 13, 14 transfer the clockwise packet (the packet P20) along the clockwise route RP200, and the tunneling device 16 transfers the clockwise packet to the host 17, so that the packet transmitted from the host 11 can reach the host 17 with reliability.

<<Master Router Selection>>

Now, the respective routers need to share, and get hold of a unified transfer direction in the ring network, such as the clockwise direction, the counterclockwise direction, and so forth. In such a case, an operator and so forth may manually set directions of the respective routers, such as the clockwise direction, and the counterclockwise direction, respectively, however, one unit of master router may be selected out of the respective routers, and automatic setting may be adopted such that all other routers comply with definition on the orientation of a direction, as decided by the master router.

Now, there is described hereinafter the operation of the master router unifying orientations of the respective routers making up the ring network, such as the clockwise direction, and the counterclockwise direction, before setting, with reference to a flow chart of FIG. 16, for describing the operation of selecting the master router, a packet format of an advertisement packet, shown in FIG. 17, a schematic representation of the operations of the respective routers transferring the advertisement packet, shown in each of FIGS. 18 to 20, a flow chart of FIG. 21, for describing the operation of the master router transferring a direction-decision packet to the respective routers, a packet format of the direction-decision packet, shown in FIG. 22, and a packet format of the direction-decision rejection packet, shown FIG. 23.

For brevity in description, there is described the case where an advertisement packet is transmitted from the router 13 to the routers 14, 15, respectively, to thereby select a master router by way of example.

Figure 16:
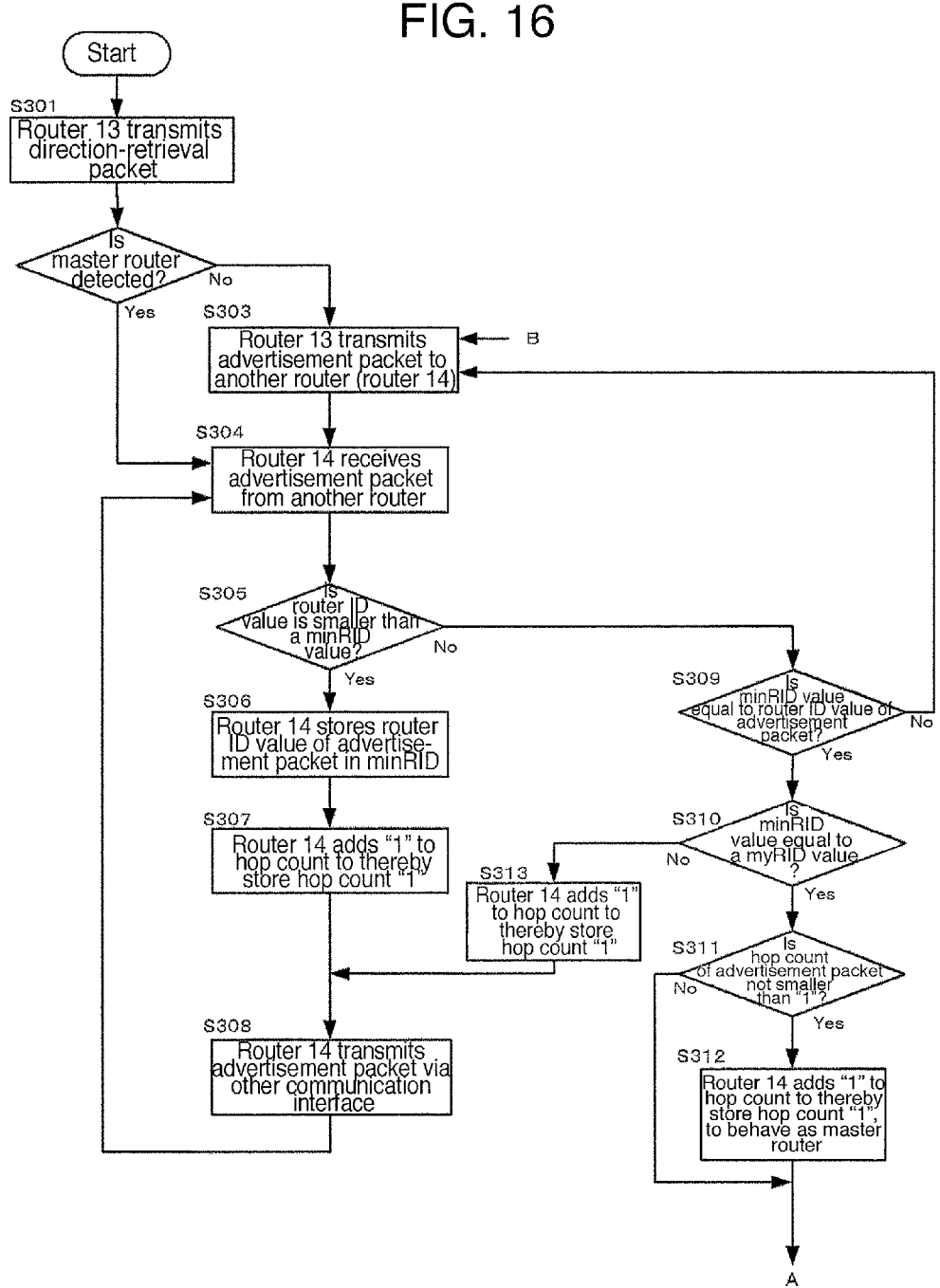
FIG. 16 is a flow chart showing an operation for selecting a master router.

In step S301, shown in FIG. 16, the arithmetic and control unit 132 of the router 13 activates the OS stored in the memory 133, and so forth, and reads a program on the OS before running the program to thereby control the router 13 in whole while the master-router detection unit 1323 of the arithmetic and control unit 132 transmits a direction-retrieval packet for retrieving the master router to the routers 14, 15, respectively. The operation of the arithmetic and control unit 132 of the router 13, for reading the program stored in the memory 133, and running the program, thereby controlling the respective units, is applicable to other routers, description thereof therefore being omitted.

In step S302, the router 13 determines whether or not the master router has been detected. If the router 13 determines that the master router cannot be detected because the master router has not been selected as yet, the operation proceeds to step S303. Further, if the router 13 has determined on the basis of a response to the direction-search packet, and so forth that the master router has been detected, the operation proceeds to step S304.

In step S303, the router 13 transmits an advertisement packet (for example, a packet P30 in FIG. 17) to a pre-assigned link local multicast address (in the case of FIG. 1, the routers 14, 15) in order to notify minRID (the identification information on a router having the smallest value, in the ring network recognized by the router 13) stored in the transfer-information storage 1326. In this case, the router 13 transmits the advertisement packet via the communication interfaces IF130, IF131, respectively.

Figure 17:
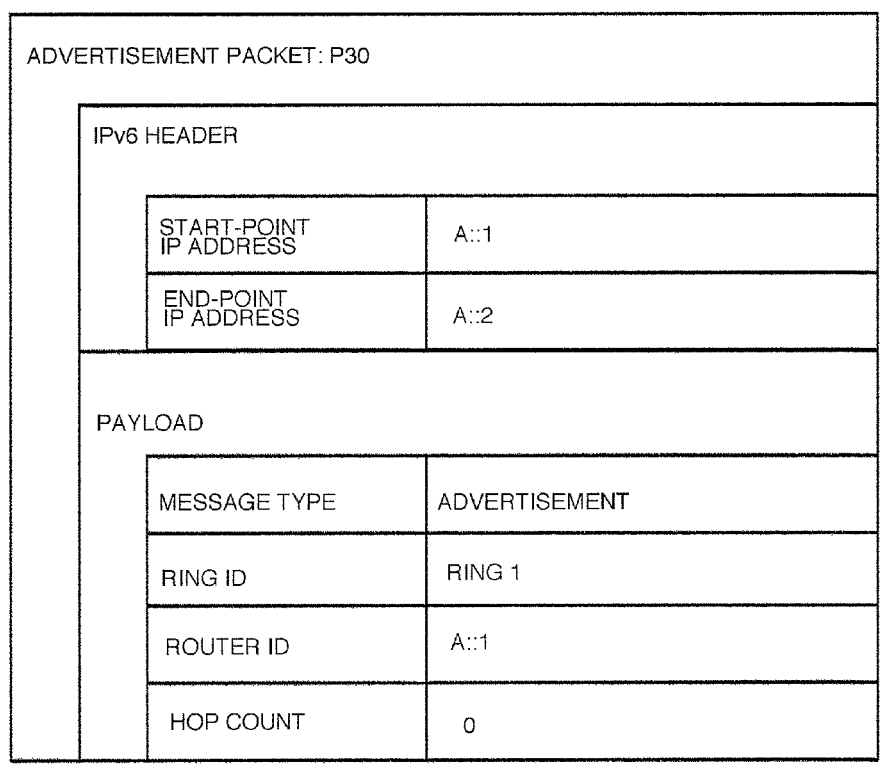
FIG. 17 is a view showing a packet format of an advertisement packet.

As shown in FIG. 17, the packet P30 has respective fields such as IPv6 header, payload, and so forth, the IPv6 header having fields such as start-point IP address, end-point IP address, and so forth, while the payload having "message type", "ring ID", "router ID" which is the minRID stored in the transfer-information storage 1326 of the router 13, and "hop count".

As shown in, for example, FIG. 17, the router 13 transmits the advertisement packet wherein a start-point IP address value (for example, the IPv6 address "A::1" of the router 13), an end-point IP address value (for example, the link local multicast address ("ff02::100") in the ring network), a message type value (for example, "advertisement"), a ring ID value (for example, "RING1", a router ID value (for example, minRID "A::1" stored in the transfer-information storage 1326 of the router 13), and hop count (initial value "0") are set to the routers 14, 15. Then, the router 14 receives the advertisement packet from the router 13 via a communication interface IF140.

Figure 18:
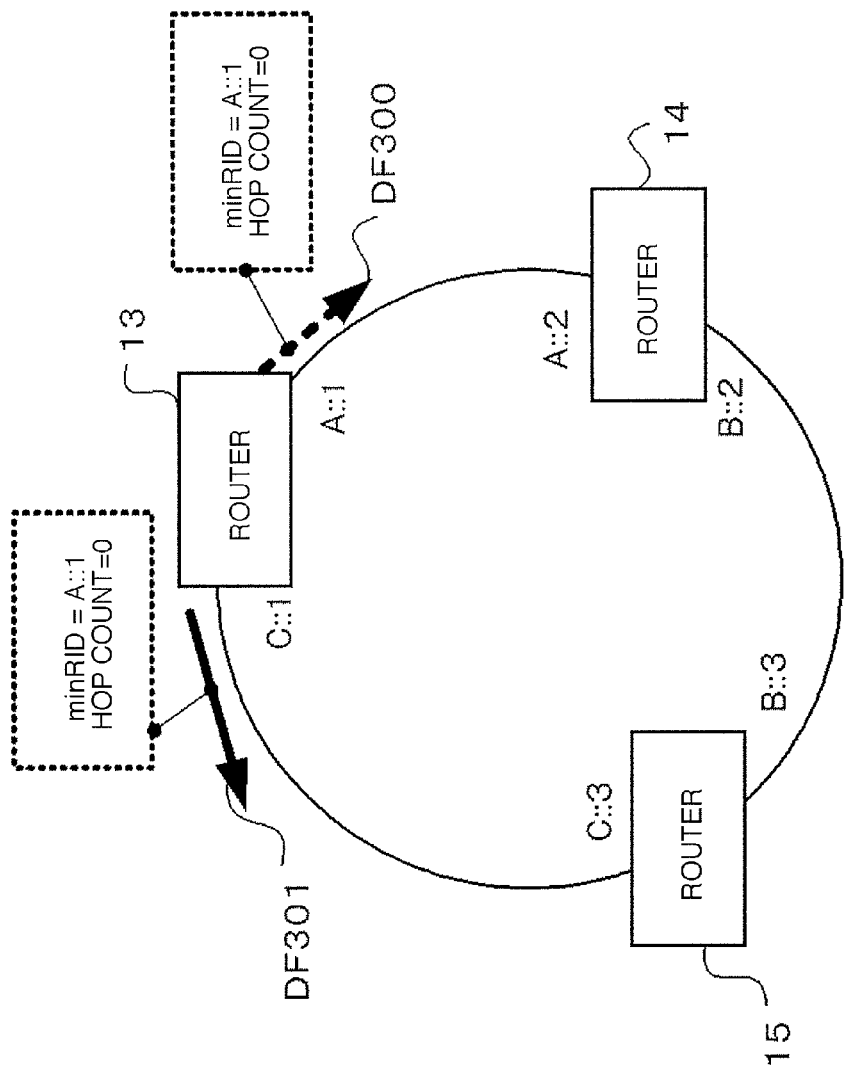
FIG. 18 is a schematic representation showing operations of the respective routers transferring an advertisement packet.

More specifically, the router 13 transmits the advertisement packet to the routers 14, 15, respectively, along a flow of packet communication DF300 from the router 13 to the router 14, and along a flow of packet communication DF301 from the router 13 to the router 15, as shown FIG. 18.

In step S304, a router (for example, the router 14) receives an advertisement packet from another router (for example, the router 13).

In step S305, the router 14 compares the router ID value of the advertisement packet with a minRID value stored in the transfer-information storage of the router 14 on the basis of the advertisement packet received from the router 13. If the minRID value (for example, "A::1") of the router 13, stored in the router ID of the advertisement packet, is smaller than the minRID value (for example, "A::2") of the router 14, the operation proceeds to step S306 provided that magnitude relation between IPv6 address and RID is expressed by 9::1<A::1<A::2<B::2<B::3<C::1<C::3.

In step S306, the arithmetic and control unit of the router 14 stores the router ID value of the advertisement packet received from the router 13 in the minRID field of the transfer-information storage.

In step S307, the router 14 adds "1" to the hop count of the advertisement packet received from the router 13 to thereby store the hop count (for example, "1") in the field of a received hop count (for the communication interface IF140) in the transfer-information storage.

In step S308, if a myRID value stored in the transfer-information storage is equal to the minRID value, or the received hop count (for the communication interface IF140) stored in the transfer-information storage is greater than "0", the master-router detection unit of the arithmetic and control unit of the router 14 generates an advertisement packet on the basis of transfer-information (for example, the minRID value "A::1", the hop count "1") stored in the transfer-information storage, thereby transferring the advertisement packet to the router 15 via the other communication interface (for example, IF141) connected to the ring network. After completion of processing in step S308, the operation proceeds to step S304.

Figure 19:
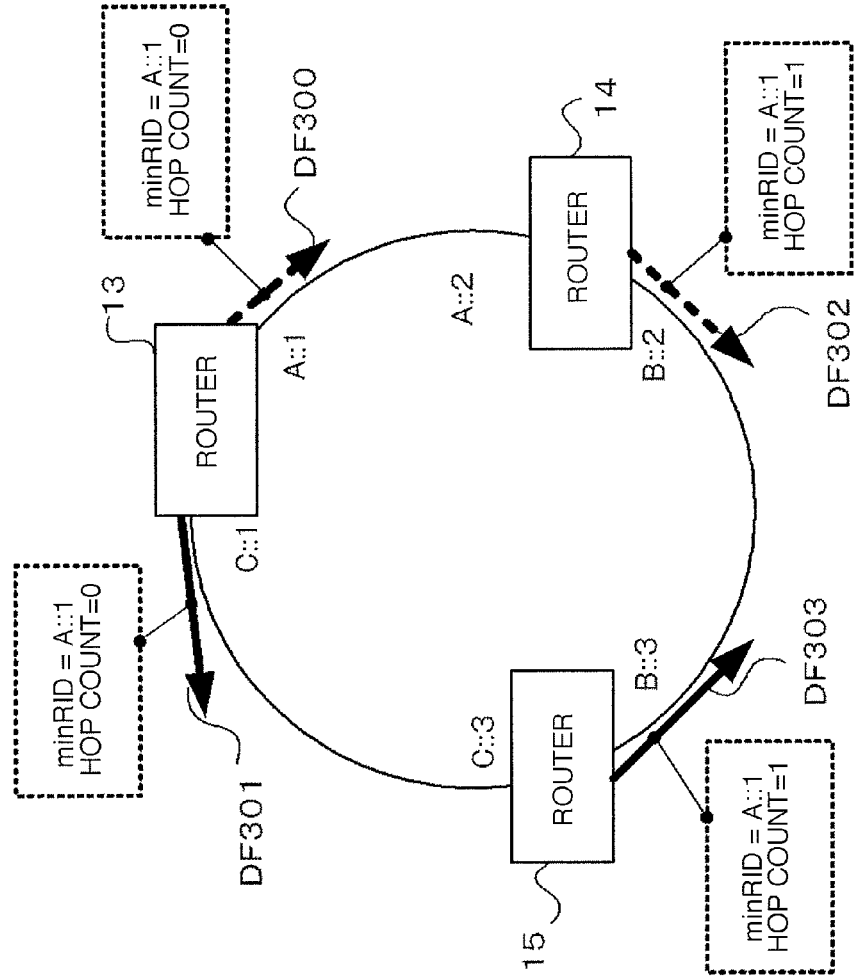
FIG. 19 is another schematic representation showing operations of the respective routers transferring the advertisement packet.

More specifically, the router 14 transmits the advertisement packet to the router 15 as shown by a flow of packet communication DF302 from the router 14 to the router 15, in FIG. 19. Further, the router 15 as well executes a similar operation against the router 14, thereby transmitting the advertisement packet to the router 14, as shown by a flow of packet communication DF303 from the router 15 to the router 14.

Figure 20:
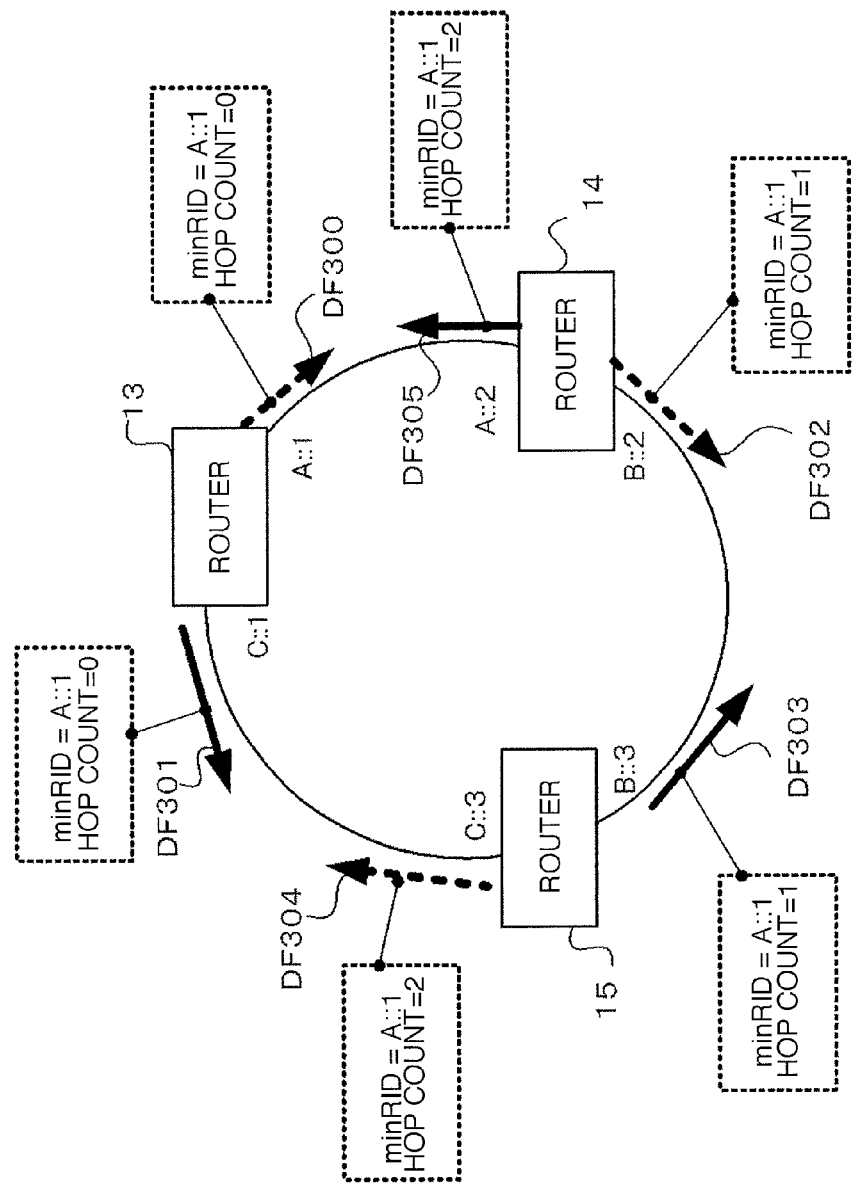
FIG. 20 is still another schematic representation showing operations of the respective routers transferring the advertisement packet.

Further, as shown by a flow of packet communication DF304 from the router 15 to the router 13, in FIG. 20, the router 15 transmits the advertisement packet to the router 13 on the basis of the advertisement packet received from the router 14. Still further, as shown by a flow of packet communication DF305 from the router 14 to the router 13, in FIG. 20, the router 14 transmits the advertisement packet to the router 13 on the basis of the advertisement packet received from the router 15, Meanwhile, in step S305, if the master-router detection unit of the router 14 detects that the router ID value (for example, "A 1") of the advertisement packet as received is not smaller than the minRID value (for example, "A::1") stored in the transfer-information storage, the operation proceeds to step S309.

In step S309, the router 14 determines whether or not a value stored in the router ID of the advertisement packet as received is equal to a minRID value stored in the transfer-information storage. If the router 14 determines that the value stored in the router ID of the advertisement packet as received is equal to the minRID value stored in the transfer-information storage, the operation proceeds to step S310.

Further, in step S309, if the router 14 determines that the value stored in the router ID of the advertisement packet as received is not equal to the minRID value stored in the transfer-information storage, the operation reverts to step S303.

In step S310, if the master-router detection unit of the router 14 detects that the myRID value stored in the transfer-information storage is equal to the minRID value, the operation proceeds to step S311.

In step S311, the master-router detection unit of the arithmetic and control unit of the router 14 determines whether or not the received hop count stored in the transfer-information storage is not smaller than "1". If the received hop count stored in the transfer-information storage is not smaller than "1", the operation proceeds to step S312.

Figure 21:
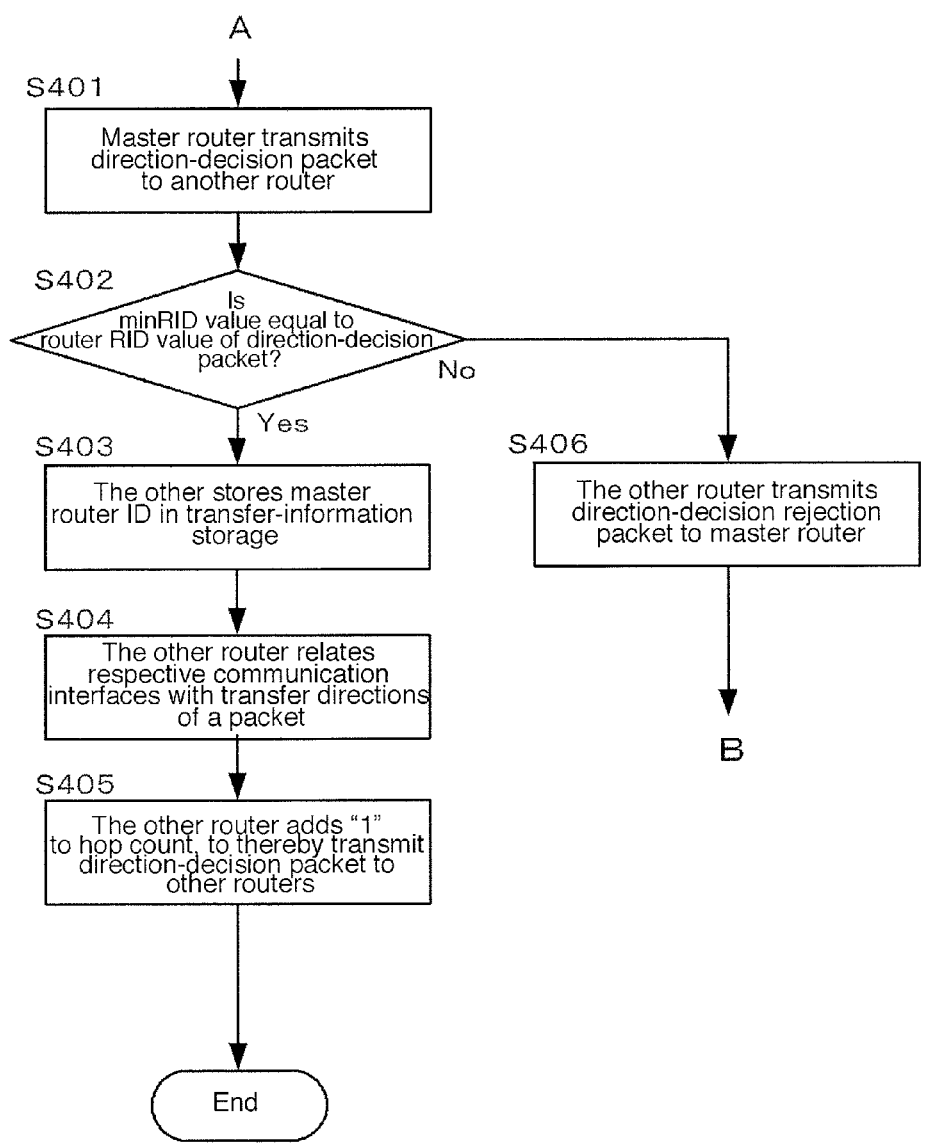
FIG. 21 is a flow chart showing the operation of the master router transferring a direction-decision packet to the respective routers.

Further, in step S311, if the received hop count stored in the transfer-information storage of the router 14 is smaller than "1", the operation proceeds to "A" in FIG. 21.

In step S312, the master-router detection unit of the router 14 adds "1" to the hop count of the advertisement packet received from another router to thereby store the hop count (for example, "1") in the field of the received hop count, and the master router operation unit starts an operation required for a master router. After completion of processing in step S312, the operation proceeds to "A" in FIG. 21.

Meanwhile, in step S310, if the myRID value stored in the transfer-information storage is not equal to the minRID value, the operation proceeds to a step S313. In step S313, the master-router detection unit of the router 14 adds "1" to the hop count of the advertisement packet received from another router to thereby store the hop count (for example, "1") in the field of the received hop count. Subsequently, after completion of processing in step S313, the operation reverts to step S308.

Thus, the respective routers transmit the advertisement packet with recognized minRID added thereto, remembering whichever minRID smaller in value among the minRIDs of the advertisement packets received, and the minRIDs so far recognized, as the minRID, while adding the minRID to the advertisement packet to be transferred to another router, whereupon if the minRID of the advertisement packet received is equal in value to the minRID so far recognized, a router identical in myRID to those minRIDs can act as a master router, so that it is possible to select the master router from among the respective routers making up the ring network.

<<Relating Interfaces of the Respective Routers with Transfer-Directions>>

Subsequently, the master router transmits the direction-decision packet to the respective routers, thereby relating the interfaces of the respective routers with the transfer direction of the packet. More specifically, in sep S401 of FIG. 21, the arithmetic and control unit of the master router (for example, the router 13) reads a program stored in the memory, and runs the program to thereby behave as the master router controlling the respective units while the direction-setting unit of the arithmetic and control unit transmits "a direction-decision packet" (for example, a direction-decision packet P40 in FIG. 22) for use in decision of the transfer direction to a pre-assigned link local multicast address.

Koko As shown in FIG. 22, the direction-decision packet P40 has respective fields such as IPv6 header, payload, and so forth, the IPv6 header having fields such as "start-point IP address", "end-point IP address", while the payload having "message type," "ring ID" serving as identification information on a ring network, "router ID" serving as a router ID of the master router, "hop count" representing the number of transferred routers, and so forth.

As shown in, for example, FIG. 22, the router 13 transmits the direction-decision packet to the router 14, the direction-decision packet being a packet wherein a start-point IP address value (for example, the IPv6 address "A::1" of the router 13), an end-point IP address value (for example, an address "A::2" of the router 14), a message type value (for example, "direction decision"), ring ID (for example, "RING1", router ID (for example, RID "A::1" of the router 13), and hop count (initial value "0") are set.

Now, there is described hereinafter the operation of the router 14, whereby a direction-decision packet has been received from the router 13. In step S402, the master-router detection unit of the arithmetic and control unit of the router 14 determines whether or not the router ID of the direction-decision packet (for example, RID "A::1" of the router 13) is equal in value to the minRID stored in the transfer-information storage, on the basis of the direction-decision packet received from the router 13. If the value of the router ID of the direction-decision packet is equal in the value of the minRID stored in the transfer-information storage, the operation proceeds to step S403.

In step S403, the master-router detection unit of the arithmetic and control unit of the router 14 stores the router ID of the direction-decision packet in the field of the master-router ID of the transfer-information storage. The master-router detection unit of the router 14 stores the router ID of the direction-decision packet "A::1" in the field of the master-router ID of the transfer-information storage.

In step S404, the transfer setting unit of the arithmetic and control unit of the router 14 sets a communication interface (for example, the communication interface "IF140") that has received the direction-decision packet from the router 13 as IF-LEFT, and the other communication interface (for example, the communication interface "IF141") as IF-RIGHT, thereby storing interface information in "IF-LEFT assigned IF", and "IF-RIGHT assigned IF" of the transfer-information storage, respectively.

In step S405, the direction-setting unit of the arithmetic and control unit of the router 14 controls the communication interface (for example, the communication interface "IF141") where IF-RIGHT is set, thereby transferring the direction-decision packet received from the router 13 to the router 15. At this point in time, the direction-setting unit of the router 14 adds "1" to the hop count, thereby transmitting the direction-decision packet to the router 15.

Then, the router 15 executes the same processing as performed in steps 402 to 404, respectively, whereupon the master-router detection unit of the router 15 stores the router ID of the direction-decision packet "A::1" in the field of the master-router ID, and the transfer setting unit of the arithmetic and control unit of the router 15 sets a communication interface (for example, a communication interface "IF150") that has received the direction-decision packet from the router 14 as IF-LEFT, and the other communication interface (for example, a communication interface "IF151") as IF-RIGHT, thereby storing interface information in "IF-LEFT assigned IF", and "IF-RIGHT assigned IF" of the transfer-information storage, respectively.

Meanwhile, if the router 14 recognizes minRID smaller in value than the router ID of, for example, a master router 13 in step S402, the router 14 determines that the router ID of the direction-decision packet (for example, RID "A::1" of the router 13) is not equal to the minRID value (for example, RID "A::0)) stored in the transfer-information storage, the operation proceeding to step S406.

In step S406, the master-router detection unit of the arithmetic and control unit of the router 14 transmits a direction-decision rejection packet (for example, a packet P41 shown FIG. 23) for notifying to the effect that direction decision is rejected to the router 13 serving as the master router.

As shown in FIG. 23, the direction-decision rejection packet P41 has fields such as IPv6 header, payload, and so forth, the IPv6 header having fields such as "start-point IP address", "end-point IP address" where a transmission source unicast address of the direction-decision packet is stored, while the payload having "message type," "ring ID" where identification information on a ring network is stored, "minimum router ID" where the minimum router ID inside a ring network recognized by a router, "hop count" representing the number of transfer routers, and so forth.

The router 14 transmits the direction-decision rejection packet to the router 12, the direction-decision rejection packet being a packet wherein, for example, a start-point IP address value (for example, the router 14), an end-point IP address value (for example, the router 13), a message type value (for example, "direction-decision rejection"), ring ID (for example, "RING1", minimum router ID (for example, "9::1"), and hop count value (for example, "1") are set.

Then, the router 13 stores a value of "minimum router ID" of the direction-decision rejection packet as received in the minRID of the transfer-information storage. Further, after completion of step S406, the operation proceeds to B in FIG. 16.

The router 15 relates the respective communication interfaces with the transfer directions of a packet on the basis of the direction-decision packet from the router 14, as is the case with the operations of the router 14.

Thus, the master router transmits the direction-decision packet to the respective routers, and the respective routers transmit the direction-decision packet to other routers, setting the communication interface that has received the direction-decision packet as IF-LEFT, and the communication interface for transmitting the direction-decision packet as IF-RIGHT, thereby enabling the communication interfaces of the respective routers to be related with transfer directions of the packet.

<<Acquisition of Transfer-Destination Addresses by the Tunneling Device>>

Further, with the present embodiment, the tunneling device needs to get hold of the transfer-destination addresses of the clockwise packet, and the counterclockwise packet, respectively. In such a case, an operator and so forth may manually set the clockwise and counterclockwise transfer-destination addresses, respectively, of each of the tunneling devices, however, the respective tunneling devices may automatically acquire the clockwise and counterclockwise transfer-destination addresses, respectively, through the intermediary of the network, before setting the same.

The operation of the tunneling device acquiring the clockwise and counterclockwise transfer-destination addresses, respectively, before setting the same is described hereinafter with reference to a flow chart of FIG. 24, the format of a direction-retrieval packet of FIG. 25, and the format of a direction-setting packet of FIG. 26.

Figure 24:
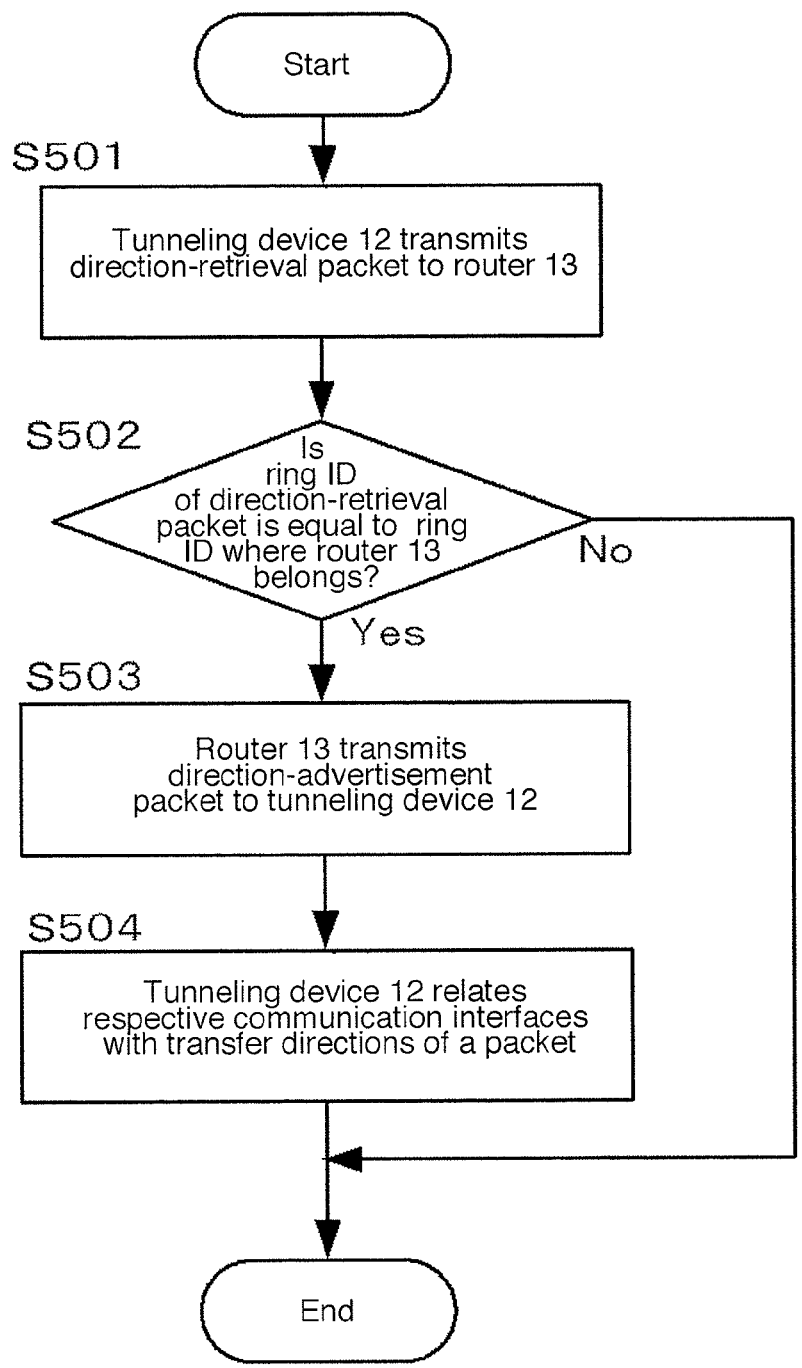
FIG. 24 is a flow chart showing the operation of the tunneling device acquiring a transfer destination address before setting.

In step S501 shown in FIG. 24, the tunneling device 12 transmits "the direction-retrieval packet" (for example, the direction-retrieval packet P50 in FIG. 25) for use in acquiring the address of a router to which the clockwise packet, and the counterclockwise packet should be transmitted to the pre-assigned link local multicast address.

Figure 25:
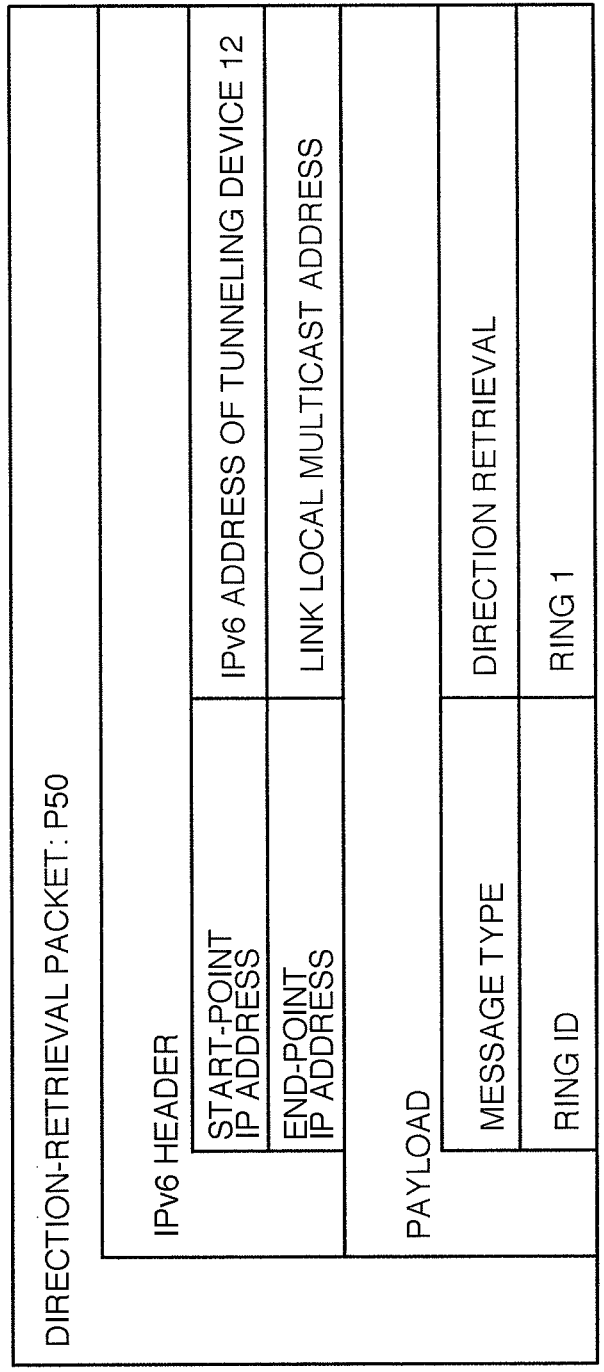
FIG. 25 is a view showing a packet format of a direction-retrieval packet.

As shown in FIG. 25, the direction-retrieval packet P50 has respective fields such as IPv6 header, payload, and so forth, the IPv6 header having fields such as "start-point IP address", and "end-point IP address", while the payload having "message type", "ring ID" representing the identification information on the ring network, and so forth.

The tunneling device 12 transmits the direction-retrieval packet to the routers 13, 15, respectively, the direction-retrieval packet being a packet wherein a start-point IP address value (for example, the IPv6 of the tunneling device 12), an end-point IP address value (for example, "the link local multicast address" in the ring network), a message type value (for example, "direction retrieval"), and ring ID (for example, "RING1") are set.

By taking the case of the router 13 receiving the direction-retrieval packet from the tunneling device 12 as an example, the operation of the router 13 is described hereinafter. It is assumed in this case that the router 13 receives the direction-retrieval packet via the communication interface IF131 of the communication unit.

In step S502, the transfer setting unit 1325 of the arithmetic and control unit 132 of the router 13 determines whether or not the ring ID of the direction-retrieval packet is equal to the ring ID where the router 13 belongs on the basis of the direction-retrieval packet as received. If so, the operation proceeds to step S503.

In step S503, the transfer setting unit 1325 of the arithmetic and control unit 132 of the router 13 generates "the direction-setting packet" (for example, the direction-setting packet P51 in FIG. 26) for use in notifying the transfer direction of a packet before transmitting the same to the tunneling device 12.

As shown in FIG. 26, the direction-setting packet P51 has respective fields such as IPv6 header, payload, and so forth, the IPv6 header having fields such as "start-point IP address", and "end-point IP address", while the payload having "message type", "ring ID" representing the identification information on the ring network, the number of the routers making up the ring network (in other words, "router numbers inside a ring" representing the sum of values of "received hop count" (for use in IF-1) and "received hop count" (for use in IF-2), in the transfer-information storage of a transmitting router), "interface name", that is, the name of the interface ("IF-RIGHT", "IF-LEFT", and so forth), representing the communication interface which has received the direction-retrieval packet, "address" representing the IPv6 addresses assigned to the interface which has received the direction-retrieval packet, and so forth.

The router 13 transmits the direction-setting packet to the unicast address of the tunneling device 12, the direction-setting packet being a packet wherein, for example, a start-point IP address value (for example, the IPv6 address "C::1" of the router 13), an end-point IP address value (for example, "the IPv6 address of the tunneling device 12"), message type value (for example, "direction-setting"), a ring ID value (for example, "RING1", "router numbers inside a ring" (for example, 3), interface name (for example, "IF-LEFT"), and an address value (for example, "C::1") are set.

In step S504, the direction-setting unit 1230 of the arithmetic and control unit 122 of the tunneling device 12 stores the address value (for example, "C::1") of the direction-setting packet in "clockwise packet transmission-destination" field of the tunneling-preparation information storage 1223 on the basis of the direction-setting packet as received. More specifically, the direction-setting unit 1230 of the tunneling device 12 is set such that the clockwise packet is transmitted to the address (for example, "C::1") of the router 13, on "IF-LEFT". Further, the tunneling device 12 stores the router numbers inside the ring, as received, in "router numbers inside a ring" of the relevant ring, in the transfer-information storage.

Since the tunneling device 12 concurrently transmits the direction-retrieval packet to the router 15 as well as the router 13, the tunneling device 12 can automatically acquire the counterclockwise packet transfer-destination address through the intermediary of the network by the same operation as in the case of processing executed in steps S501 to S504.

Thus, the tunneling device transmits the direction-retrieval packet to the respective routers with the use of the multicast address, and the respective routers transmit the direction-setting packet containing the name of the communication interface (for example, "IF-RIGHT", "IF-LEFT") having received the direction-retrieval packet, and the address assigned to the interface name, whereupon the tunneling device is able to acquire the clockwise packet transfer-destination address and the counterclockwise packet transfer-destination address.

<<Tunneling Retrieval>>

Figure 27:
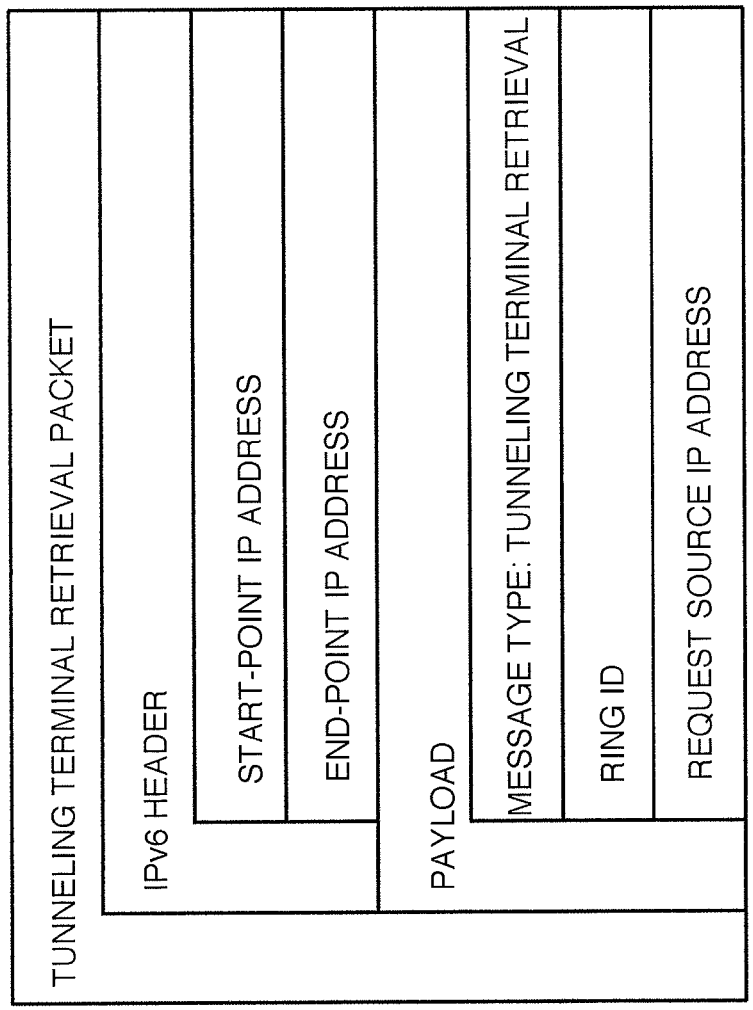
FIG. 27 is a view showing an example of a format of a tunneling terminal retrieval packet.
Figure 28:
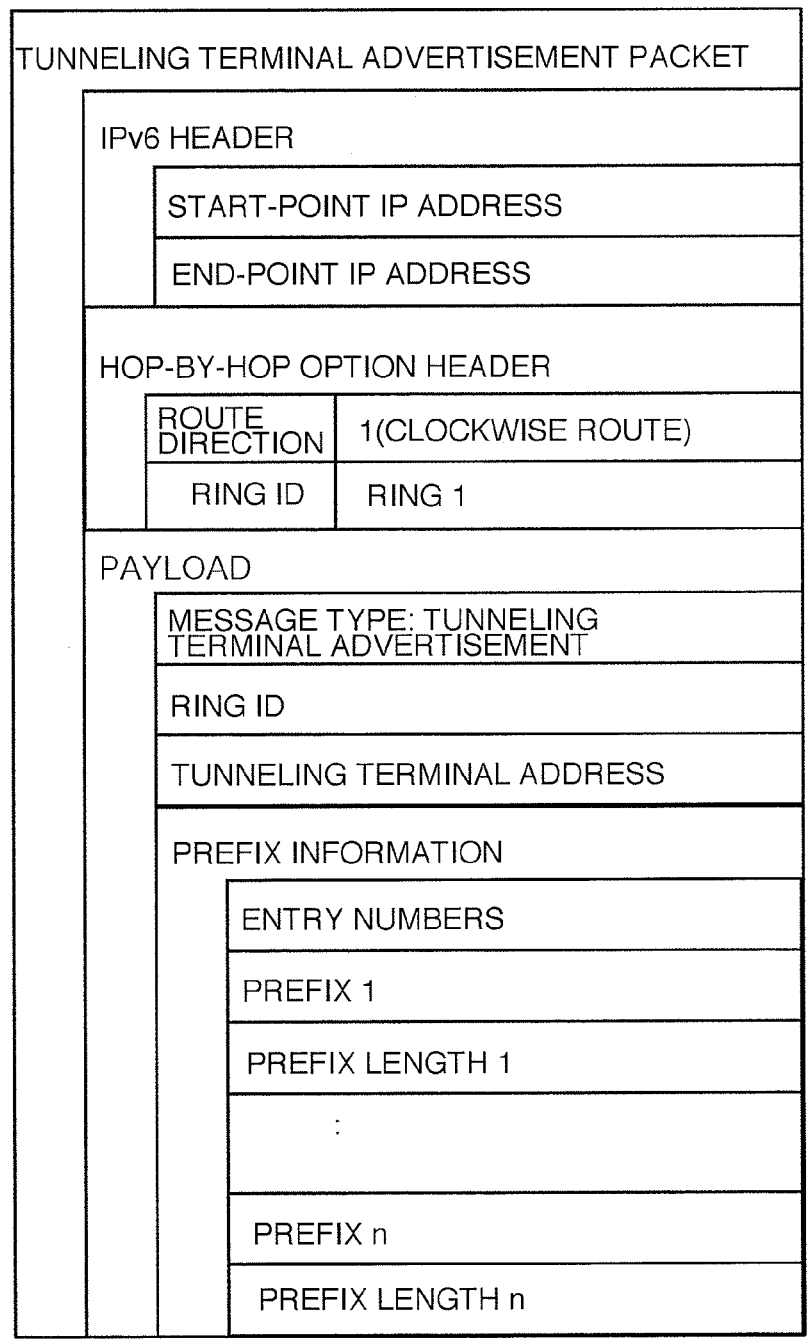
FIG. 28 is a view showing an example of a format of a tunneling terminal advertisement packet.

When a router is added to a ring network, or an extant router is reactivated, the tunneling device of the IP network system according to the present invention needs to get hold of a router positioned at the tunneling terminal. In such a case, the tunneling device according to the present invention gets hold of the router by retrieving the router positioned at the tunneling terminal. Retrieval operations (1) to (3) are described hereinafter. The case of reactivating, for example, the router 15 in FIG. 1 is described by way of example. FIG. 27 shows an example of a format of a tunneling terminal retrieval packet, and FIG. 28 shows an example of a format of a tunneling terminal advertisement packet.

(1) Upon reactivation, the router 15 executes direction retrieval described as above, subsequently transmitting the tunneling terminal retrieval packet shown in FIG. 27 to a network C with IF-RIGHT connected thereto. Respective fields of the tunneling terminal retrieval packet are as follows.

As shown in FIG. 27, the tunneling terminal retrieval packet has respective fields such as IPv6 header, payload, and so forth, the IPv6 header having fields such as "start-point IP address" where a transmission source IP address is stored, and "end-point IP address" where a link local multicast address for setting is stored, the payload having "message type" where type information indicating tunneling terminal retrieval, "ring ID" representing the identification information on a ring network, and so forth.

Further, an address (other than the link local multicast address) of the router having transmitted the tunneling terminal retrieval packet is stored in "request source IP address". The tunneling terminal retrieval packet is processed by a router having received the same through IF-LEFT.

(2) The tunneling device 12 transmits the tunneling terminal advertisement packet shown in FIG. 28. Respective fields of the tunneling terminal advertisement packet are as follows.

As shown in FIG. 28, the tunneling terminal advertisement packet has respective fields such as IPv6 header, hop-by-hop option header, payload and so forth, the IPv6 header having "start-point IP address" where a transmission source IP address is stored, "end-point IP address" where the unicast address of the router 15, stored in "request source IP address" of "request source IP address" of the tunneling terminal retrieval packet, is stored, the hop-by-hop option header having "route direction" where clockwise direction, and counterclockwise direction, in a ring network, are stored, and "ring ID" where the identifier of the ring network is stored, the payload having has fields such as "message type" where type information indicating tunneling terminal advertisement, "ring ID", that is, identification information on the ring network, "tunneling terminal address" (for this address, use is made of an IF-RIGHT address other than the link local address) which is an address positioned at the tunneling terminal, one piece of, or a plurality of pieces of "prefix information" showing prefix of a network present behind a tunneling terminal device and a prefix length, in pairs, and so forth.

Further, "the prefix information" has "entry numbers" where the number of pieces of stored prefix information is stored, "prefix" where the prefixes of IPv6 addresses are stored, "prefix length" where prefix lengths are stored, and so forth.

Because the tunneling terminal retrieval packet transmitted by the router 15 reaches the router 13 as well, the same processing as executed by the tunneling device 12, and the router 15, respectively, is required for the router 13 as well. Further, the router 13 transmits the tunneling terminal retrieval packet from "IF-RIGHT". At this point in time, the router 13 rewrites only the start-point IP address to the address for the router 13.

Further, when the tunneling terminal retrieval packet has returned to a request-source router that has transmitted the tunneling terminal retrieval packet, the router abandons the packet.

(3) The router 15, upon receiving the tunneling terminal advertisement packet, relates all pieces of the prefix information, contained in the advertisement, to "the tunneling terminal address" stored in the advertisement packet, thereby holding those information. If the router 15 receives the advertisement packet having a different transmission source address against the same prefix, the router 15 makes use of the latest one.

Furthermore, with the present embodiment under <<tunneling retrieval>> as above, it is described that the router transmits the tunneling terminal retrieval packet wherein the link local multicast address for setting is stored as "end-point IP address", however, there is no particular limitation thereto, and the tunneling terminal retrieval packet may be a packet wherein a multicast address for setting, such as an administrative local multicast address, a site local multicast address, an organization local multicast address, a global address, and so forth, is stored. The present invention is effective in that, in so doing, the tunneling terminal retrieval packet can be transmitted to not only a link-local router but also all the routers making up a ring network. Further, the administrative local multicast address for setting, and so forth are to be pre-set to the routers making up the ring network.

As a result, even when a router is added to a ring network, or an extant router is reactivated, the IP network system, and the tunneling device (or a router having an equivalent function), according to the present invention, are capable of getting hold of the router that will serve as the tunneling terminal.

<<Addition and Reactivation of a Router>>

Next, there is described hereinafter the operation of a router when the router is newly added to a ring of the IP network system according to the present invention, or an extant router is reactivated. The operation of the router 14 shown in FIG. 1 will be described hereinafter by way of example.

(1) The router 14 transmits the direction-retrieval packet shown in FIG. 25 to networks A, B, respectively.

(2) The respective routers on the same ring, having received the direction-retrieval packet, compare the ring ID within the direction-retrieval packet with ring IDs stored in the memory, and if the former matches the ring ID of a ring where respective routers themselves belong, they transmit the direction-setting packet shown in FIG. 26 to the router 14. In this case, the respective fields of the direction-setting packet have the following makeup, The direction-setting packet has the IPv6 header comprising fields such as "start-point IP address" where a transmission source IP address is stored, and "end-point IP address" where the address of a transmission source device (for example, the router 14) having transmitted the direction-retrieval packet is stored, and further, the direction-setting packet has the payload comprising the fields such as "message type" where type information indicating the direction-setting, "ring ID" where identification information on a ring network designated in the direction-retrieval packet is stored, "router numbers inside a ring" where the number of the routers making up the ring network is stored, representing the sum of values of "received hop count" (for use in IF-2), "received hop count" (for use in IF-1) in the transfer-information storage of a router, "interface name", that is, the name of the interface ("IF-RIGHT", "IF-LEFT"), in the ring ID of an interface which has received an inquiry from a router is stored, "address" where the link local address of an interface designated in "the interface name" is stored, and so forth.

(3) The router 14 having received the direction-setting packet stores an interface address notified as IF-RIGHT in the counterclockwise packet transfer-destination address of a transfer-information storage region, and stores an interface address notified as IF-LEFT in the clockwise packet transfer-destination address.

Figure 29:
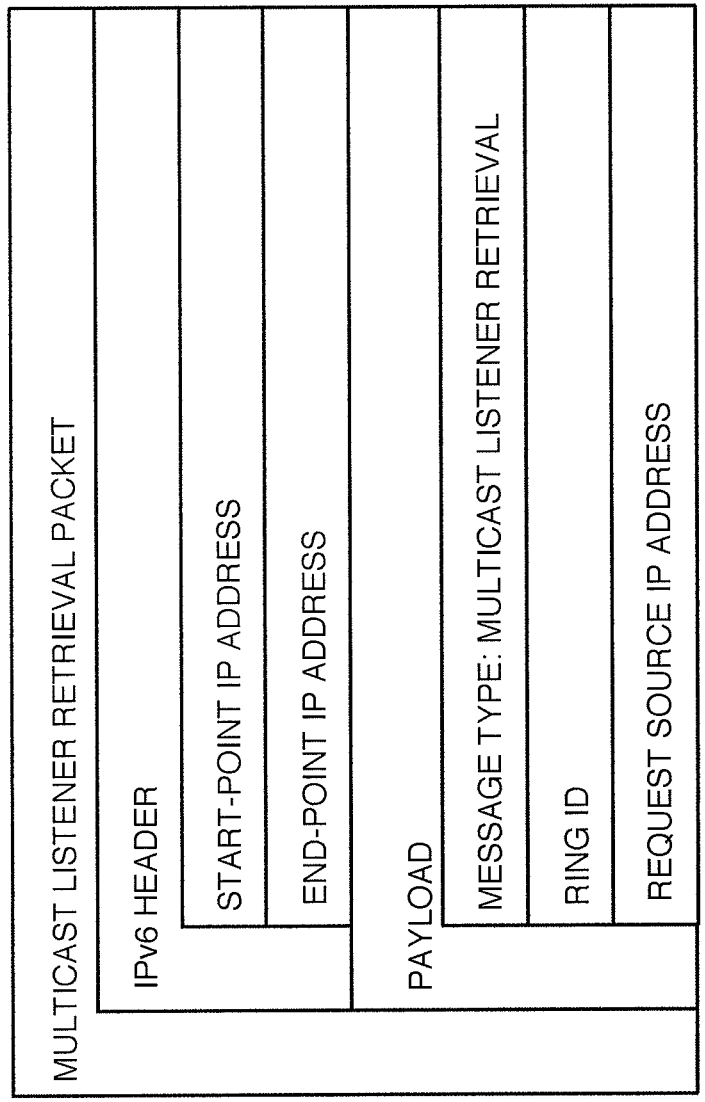
FIG. 29 is a view showing an example of a format of a multicast listener retrieval packet.

(4) Then, if the router 14 has the function of the tunneling device according to the present invention, the router 14 executes <<tunneling retrieval>> as above, thereby retrieving a tunneling terminal device for neighborhood unicast (5) Further, if the router 14 has the function of the tunneling device according to the present invention, the router 14 transmits a multicast listener retrieval packet shown in FIG. 29, thereby retrieving a multicast listener. Such an operation will be described in detail under <<multicast listener retrieval>> described later in the present specification.

<<Addition and Reactivation of a Tunneling Device>>

The operation of a tunneling device when the tunneling device is newly added to the IP network system according to the present invention, or an extant tunneling device is reactivated is substantially the same as the operation of the router, as described under <<addition and reactivation of a router>>, omitting therefore description thereof. The tunneling device differs from the router mainly in respect of the number of interfaces owned by those members, respectively, and the tunneling device transmits the direction-retrieval packet•the tunneling terminal advertisement packet from one of the interfaces to a ring network (to IF-LEFT as the transfer destination of the clockwise packet).

<<Multicast Listener Retrieval>>

There is described hereinafter the operation of the tunneling device executing multicast listener retrieval when a tunneling device is newly added to the IP network system according to the present invention, or an extant tunneling device is reactivated. The operation of the tunneling device 12 shown in FIG. 1 will be described hereinafter by way of example. Further, it is assumed that the tunneling device 12 has already completed processing under (1) through (5) under <<addition and reactivation of a router>>, described as above.

(1) The tunneling device 12 transmits the multicast listener retrieval packet shown in FIG. 29 to a network connected to the ring, and so forth (a router in the ring executes a similar operation, in which case, the router in the ring transmits the retrieval packet to IF-RIGHT as the transfer destination of the counterclockwise packet).

FIG. 29 shows an example of format of the multicast listener retrieval packet. The respective fields of the multicast listener retrieval packet are as follows.

As shown in FIG. 29, the multicast listener retrieval packet has respective fields such as IPv6 header, and payload, the IPv6 header having fields such as "start-point IP address" where a transmission source IP address is stored, and "end-point IP address" where a link local multicast address for setting is stored, the payload having fields such as "message type" where type information indicating multicast listener retrieval is stored, "ring ID" where the ID of a ring network in which a router participates, representing the identification information on the ring network, is stored, "request source IP address" where an IF-RIGHT address of a router having generated the multicast listener retrieval packet is stored, and so forth.

A ring router (for example, the router 13) having received the multicast listener retrieval packet through IF-LEFT transmits the same to the router 14 via IF-RIGHT. The ring router does not transmit the multicast listener retrieval packet to a link having the same prefix as that of the request source IP address.

Figure 30:
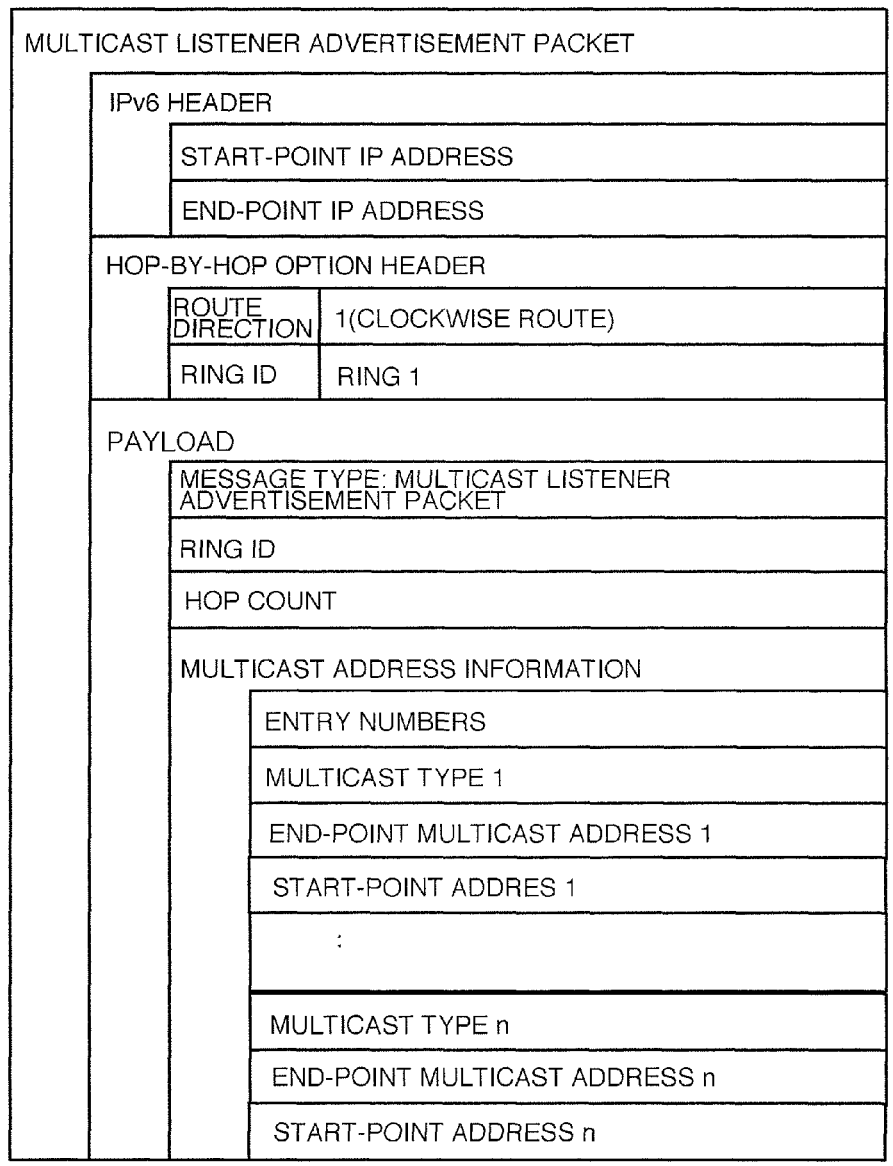
FIG. 30 is a view showing an example of a format of a multicast listener advertisement packet.
Figure 31:
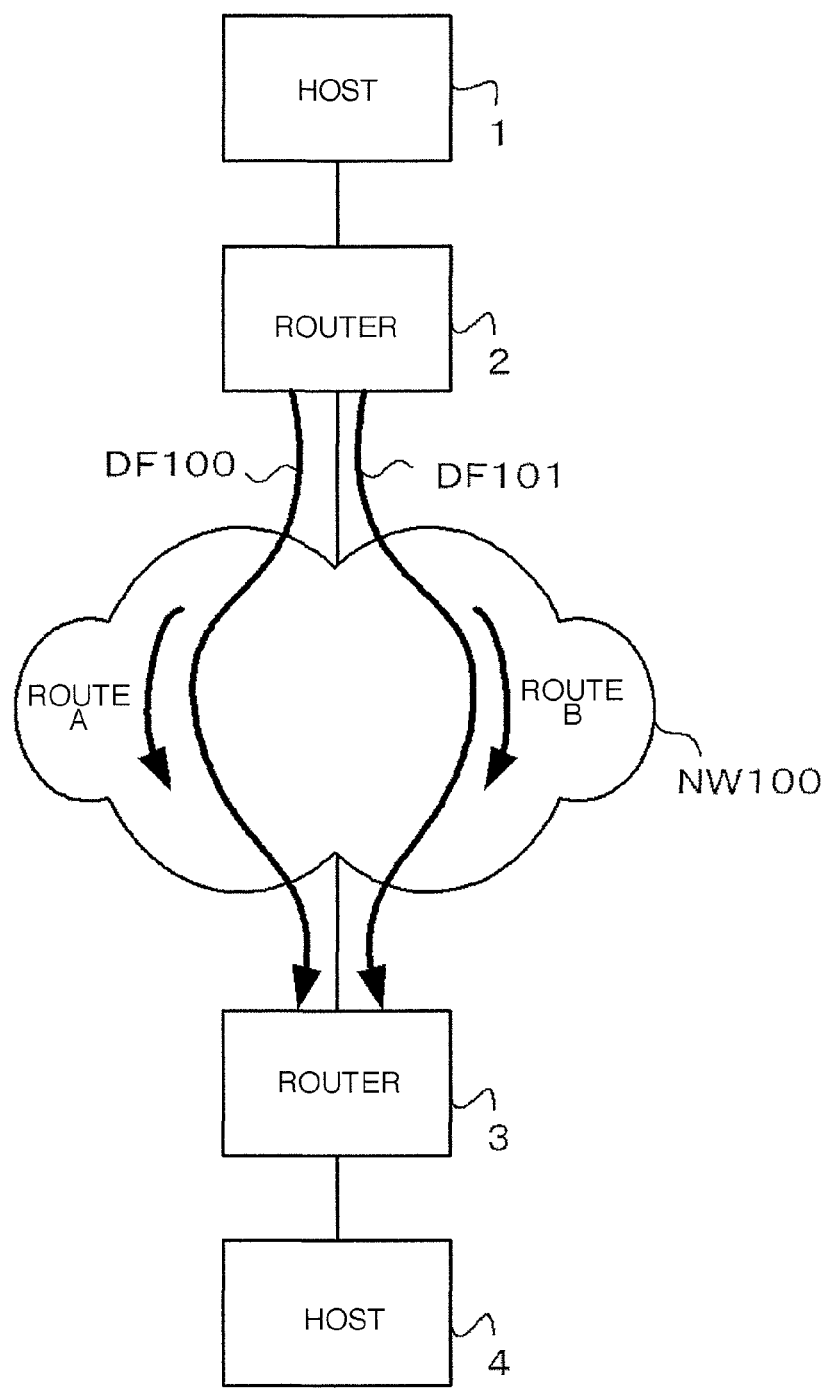
FIG. 31 is a configuration block diagram showing an example of a conventional IP network system.

(2) When the tunneling device 16 has received a multicast listener retrieval packet via the router 14, and so forth, the tunneling device 16 transmits a multicast listener advertisement packet shown in FIG. 30. FIG. 30 shows an example of a format of the multicast listener advertisement packet. Respective fields of the multicast listener advertisement packet are as follows.

As shown in FIG. 30, the multicast listener advertisement packet has respective fields such as IPv6 header, hop-by-hop option header, payload and so forth, the IPv6 header having "start-point IP address" where a transmission source IP address is stored, "end-point IP address" where the address of the tunneling device 16 or "request source IP address" of the multicast listener advertisement packet as received is stored, the hop-by-hop option header having "route direction" where clockwise direction, and counterclockwise direction, in a ring network, are stored, and "ring ID" where the identifier of the ring network is stored, the payload having fields such as "message type" where type information indicating multicast listener advertisement is stored, "ring ID" where identification information on a ring network is stored, "hop count" representing the number of ring routers through which the message should be transferred inside a ring (or the value of "router numbers inside a ring" in a transfer-information storage region of each router, a plurality of pieces of "multicast address information" for storing multicast information to be transferred to networks behind a tunneling device as the tunneling terminal, and so forth.

Further, respective fields of the plurality of the pieces of "multicast address information" have "entry numbers" where multicast numbers contained in the message (multicast listener advertisement) is stored, "multicast type" where the multicast information (for example, SSM: 1, non-SSM: 0) showing effectiveness•invalidation of SSM (Source-Specific-Multicast) is stored, "end-point multicast address" where a multicast address as a target is stored, "start-point address" for storing a transmission source address of a multicast packet as a target in the case of SSM, and ASM (Any-Source-Multicast) in the case of non-SSM, and so forth.

Further, when a ring router (for example: the router 13) happens to be at the tunneling terminal, the router 13 may transmit the multicast listener advertisement packet in the same way as described above. The multicast listener advertisement packet needs to be periodically sent out by a tunneling device, in which case, a destination will be a link local multicast address for setting. Further, in this case, the hop-by-hop option header is unnecessary. In the case where the destination is the link local multicast address for setting, a ring router having received the message through the interface IF-LEFT" transmits the message to the interface IF-RIGHT. The router does not transfer the multicast listener advertisement packet to a link having the same prefix as that of the request source IP address.

(3) The tunneling device 12 that has received the multicast listener advertisement packet holds all the pieces of the multicast address information, contained in the advertisement packet. However, there is no need for holding the multicast information on SSM 1 (SSM is effective) except for the case where the start-point address of the relevant entry is present in a network behind the tunneling device.

Further, the tunneling device 12 holds a multicast address which the tunneling device 12 itself should transmit to a ring network in the transfer-target multicast information storage 1231. Respective entries contained therein have effective time, and if there is no advertisement on a pertinent entry for a given time length, the entry is deleted.

Still further, the tunneling device 12 can control a multicast address joined by a multicast listener present behind the tunneling device 12 itself by making use of a list prepared by another scheme such as MLD v2. Such a table needs to be synchronized in content with the multicast listener advertisement packet.

Since the respective fields of the transfer-target multicast information storage 1231 are the same as described in the foregoing (FIG. 6), description thereof is omitted herein.

Further, with the embodiment under <<multicast listener retrieval>>, it is described that the tunneling device transmits the multicast listener retrieval packet wherein the link local multicast address for setting is stored as the "end-point IP address", however, there is no particular limitation thereto. The present invention is effective in that the tunneling terminal retrieval packet can be transmitted to not only the link local but also all the routers making up the ring network with the use of the end-point IP address. In this connection the link local multicast address for setting is to be pre-set to the routers making up the ring network.

As a result, with the IP network system according to the present invention, even when a tunneling device (or a router having an equivalent function) is newly added thereto, or an extant tunneling device thereof is reactivated, the tunneling device is able to execute retrieval of a multicast listener, thereby getting hold of a multicast address to be transmitted to a ring network on its own. Furthermore, even if a trouble occurs to any of the routes in a ring network, it is possible to cause a packet from a transmission source host to a transmission destination host to reach a transmission destination with reliability.

With the present embodiment described in the foregoing, the ring network is made up of the routers 13 to 15, however, there is no limitation thereto, and a plurality of ring networks each may be made up of a plurality of routers.

Further, with the present embodiment described in the foregoing, the tunneling devices 12, 16 each apply the encapsulation processing to a packets received from each of the hosts, thereby generating the tunneling packet to be transferred to the respective routers while applying the de-capsulation processing to the tunneling packet received from each of the routers, thereby reproducing the packet before application of the encapsulation processing to be transferred to the host at the transmission source, however, there is no limitation thereto. The respective hosts, the respective routers, and the respective repeaters having the routing function may be provided with the function of the tunneling device.

For example, in the case where the respective routers, as constituent members of the ring network, are provided with the function of the tunneling device, the router connected to the host at the transmission source applies the encapsulation processing to the packet received from the host at the transmission source, thereby generating a tunneling packet, and duplicating the tunneling packet while adding a transfer direction indicating the clockwise direction, and the counterclockwise direction, in the ring network, respectively, to a duplicated tunneling packet before transmitting the duplicated tunneling packet to the clockwise route, and the counterclockwise route, respectively.

Then, the router connected to a host at a transmission destination applies the de-capsulation processing to a tunneling packet received from any of other routers, thereby reproducing the packet before application of the encapsulation processing to subsequently, transmit a reproduced packet to the host at the transmission destination on the basis of a network address of the host at the transmission destination, contained in the reproduced packet.

Further, in the case where the respective hosts are provided with the function of the tunneling device, the host at a transmission source applies the encapsulation processing to a packet addressed to the host at a transmission destination, thereby generating a tunneling packet, and duplicating the tunneling packet while adding a transfer direction indicating the clockwise direction, and the counterclockwise direction, in the ring network, respectively, to a duplicated tunneling packet to subsequently transmit the duplicated tunneling packet to the clockwise route, and the counterclockwise route, in the ring network, respectively.

The host at the transmission source applies the de-capsulation processing to a tunneling packet received from any of the routers, thereby reproducing the packet before application of the encapsulation processing to transfer the reproduced packet to the host at the transmission destination on the basis of the network address of the host at the transmission destination, contained in the reproduced packet.

With the present embodiment, it is described that the packet communication between the hosts 11, 17 is carried out by utilizing the tunneling communication with the use of the tunneling devices 12, 16, however, if transmission is enabled from the host at the transmission source to the host at the transmission destination via the clockwise route, and the counterclockwise route, in the ring network, respectively, it is possible to do away with the tunneling device, and the tunneling communication may not be utilized.

For example, the host at the transmission source on its own adds the IPv6 header including the hop-by-hop option header wherein "route direction", "ring ID" and "packet ID" are indicated to a packet before transmission, so that when the respective repeaters such as the routers receive the packet from the host at the transmission source, the repeater analyzes the packet to thereby transfer the packet to another repeater or the host at the transmission destination, connected to the repeater itself in the clockwise direction, if the transfer direction information of the packet received indicates the clockwise direction, transferring the packet to another repeater or the host at the transmission destination, connected to the repeater itself in the counterclockwise direction, if the transfer direction information of the packet received indicates the counterclockwise direction, on the basis of the transfer direction information, and the network address of the host at the transmission destination, contained in the packet received.

Further, with the present embodiment, it is described that the packet communication between the hosts 11, 17 is carried out through the intermediary of the ring network made up of the routers 13 to 15, however, there is no limitation thereto, and two or more units of the hosts each may carry out the packet communication through the intermediary of not less than two ring networks.

Still further, with the present embodiment, it is described that the tunneling communication is carried out between the tunneling devices 12, 16 via the ring network, however, there is no limitation thereto, and two or more units of the tunneling devices each may carry out the tunneling communication through the intermediary of not less than two ring networks.

Furthermore, the packet according to the present invention may be a packet as specified by RFC 2460 {Internet Protocol Version 6 (IPv6) specification}, making use of the IPv6 header, hop-by-hop option header, and destination option header, As described in the foregoing, with the present invention, it is possible to implement an IP network system capable of causing a packet to reach a destination with reliability even if a trouble occurs to any of routers, and the respective routers can automatically get hold of the transfer direction indicating the clockwise direction, and the counterclockwise direction, in the ring network, respectively, thereby automatically acquiring the clockwise-packet transfer destination, and the counterclockwise-packet transfer destination.

What is claimed is:

1. An IP network system wherein packet communication is executed between respective hosts through an intermediary of a ring network comprised of at least a plurality of repeaters, the respective repeaters comprising:

an arithmetic and control unit for transferring a packet to a host at a transmission destination via a clockwise route, and a counterclockwise route, in the ring network, respectively, on the basis of transfer direction information contained in a tunneling packet generated on the basis of a transmitted packet transmitted from a host at a transmission source, as one of the respective hosts, to the host at the transmission destination, and subjected to multicast transmission to a multicast address where the host at the transmission destination belongs, wherein each repeater comprises:

a memory for storing the multicast address where the host at the transmission destination belongs, and network addresses of other of the plurality of repeaters connected to the repeater itself, and at least any of the respective hosts; and a communication unit for executing packet communication with the respective hosts, and other repeaters, and receiving the transmitted packet transmitted from the host at the transmission source to the host at the transmission destination;

wherein the arithmetic and control unit is for applying encapsulation processing to the transmitted packet, thereby generating and duplicating a tunneling packet while adding transfer direction information to the tunneling packet before effecting multicast transmission to the multicast address, and transmitting the tunneling packet in the clockwise direction, and the counterclockwise direction, in the ring network, respectively, on the basis of the transfer direction information, upon receiving the tunneling packet via the communication unit, or if a host belonging to a destination group of the tunneling packet as received is connected to the repeater itself, reproducing the transmitted packet before application of the encapsulation processing, thereby transferring the transmitted packet to the host at the transmission destination.

2. The IP network system according to claim 1, wherein each repeater comprises a router.

3. An IP network system wherein packet communication is executed between respective hosts through an intermediary of a ring network comprised of at least a plurality of repeaters, the respective repeaters comprising:

an arithmetic and control unit for transferring a packet to a host at a transmission destination via a clockwise route, and a counterclockwise route, in the ring network, respectively, on the basis of transfer direction information contained in a tunneling packet generated on the basis of a transmitted packet transmitted from a host at a transmission source, as one of the respective hosts, to the host at the transmission destination, and subjected to multicast transmission to a multicast address where the host at the transmission destination belongs, and further comprising a plurality of tunneling devices, the tunneling devices each comprising:

a communication unit for executing packet communication between the ring network and the respective hosts, and receiving the transmitted packet transmitted from the host at the transmission source to the host at the transmission destination;

a memory for storing a program for running the tunneling device, the multicast address where the host at the transmission destination belongs, routing information and network addresses of at least any of the respective hosts; and an arithmetic and control unit for applying encapsulation processing to a transmitted packet from the host at the transmission source, thereby generating and duplicating the tunneling packet while adding transfer direction information to the tunneling packet before effecting multicast transmission to the multicast address, and upon receiving the tunneling packet via the communication unit, reproducing the transmitted packet before application of the encapsulation processing, thereby transferring the transmitted packet to the host at the transmission destination.

4. The IP network system according to claim 3, wherein each repeater comprises a router.

5. An IP network system wherein packet communication is executed between respective hosts through an intermediary of a ring network comprised of at least a plurality of repeaters, said IP network system comprising tunneling devices each comprising:

a communication unit for executing packet communication between the ring network and the respective hosts, and receiving a transmitted packet transmitted from a host at a transmission source to a host at a transmission destination; and an arithmetic and control unit for generating a tunneling packet on the basis of the transmitted packet, and duplicating the tunneling packet while adding transfer direction information to the tunneling packet before effecting multicast transmission to a multicast address where the host at the transmission destination belongs, wherein the repeaters each comprise an arithmetic and control unit for transferring the transmitted packet to the host at the transmission destination via a clockwise route, and a counterclockwise route, in the ring network, respectively, on the basis of transfer direction information contained in the tunneling packet, and wherein the respective tunneling devices each comprises:

a memory for storing a program for running the tunneling device, the multicast address where the host at the transmission destination belongs, routing information and network addresses of at least any of the respective hosts; and wherein the arithmetic and control unit is for applying encapsulation processing to the transmitted packet, thereby generating and duplicating the tunneling packet while adding the transfer direction information, and the multicast address where the host at the transmission destination belongs to the tunneling packet duplicated before effecting multicast transmission to the multicast address, reproducing the transmitted packet before application of the encapsulation processing, upon receiving the tunneling packet via the communication unit, thereby transferring the transmitted packet to the host at the transmission destination.

6. The IP network system according to claim 5, wherein each repeater comprises a router.

7. An IP network system wherein packet communication is executed between respective hosts through an intermediary of a ring network comprised of at least a plurality of repeaters, the respective repeaters comprising:

an arithmetic and control unit for transferring a packet to a host at a transmission destination via a clockwise route, and a counterclockwise route, in the ring network, respectively, on the basis of transfer direction information contained in a tunneling packet generated on the basis of a transmitted packet transmitted from a host at a transmission source, as one of the respective hosts, to the host at the transmission destination, and subjected to multicast transmission to a multicast address where the host at the transmission destination belongs, wherein each of the plurality of repeaters transmits a direction-setting packet for setting a transfer direction to other of the plurality of repeaters connected to the same ring network, sharing the transfer direction with other of the plurality of repeaters while the communication unit is provided with first and second communication interfaces for transferring a tunneling packet in a given direction in the ring network, and upon the first communication interface receiving the direction-setting packet from other of the plurality of repeaters, the arithmetic and control unit sets the first communication interface as an interface for transmitting a packet in the counterclockwise direction or in the clockwise direction, setting the second communication interface as an interface for transmitting the packet in the clockwise direction or in the counterclockwise direction.

8. The IP network system according to claim 7, wherein each repeater comprises a router.

9. An IP network system wherein hosts are connected to a ring network, comprised of a plurality of routers, via tunneling devices, and packet communication is executed between respective hosts through an intermediary of a plurality of repeaters, including the routers and the tunneling devices:

the routers each comprising:
a communication unit for executing communication with the tunneling devices and the hosts, and provided with a plurality of communication interfaces to which are assigned (1) an operation for transmitting a clockwise packet and receiving a counterclockwise packet, and (2) an operation for transmitting a counterclockwise packet and receiving a clockwise packet;
a packet transmit/receive unit for executing transmit/receive of a packet, including a tunneling packet:
a transfer determination unit for determining in which direction a tunneling packet received from the tunneling devices is to be transferred, in a clockwise direction or in a counterclockwise direction, and analyzing the tunneling packet which the packet transmit/receive unit has received from the respective routers before finding transferred packet information;
a master-router detection unit for executing a search for and detection of a master-router;
a master router operation unit for operating the router itself as the master-router;
a transfer setting unit for setting operations of the respective communication interfaces in the communication unit of the router itself, transmitting a direction-deciding packet for use in setting and sharing of a transfer-direction of the packet in the ring network to other of said plurality of routers;
a transfer-information storage for storing (1) routing-information toward hosts and other routers, (2) transfer-information including respective network addresses of the repeaters for use in transferring the clockwise packet and the counterclockwise packet, (3) setting information for setting the operations of the communication interfaces in the communication unit, (4) ring network information including an identification of the master router of the ring network to which the router itself is connected, and (5) the transfer destination; and
a multicast packet information storage for storing the transferred packet information, which the transfer determination unit analyzed.

10. The IP network system according to claim 9, wherein each repeater comprises a router.

11. An IP network system wherein hosts are connected to a ring network, comprised of a plurality of routers via tunneling devices, and packet communication is executed between respective hosts through an intermediary of a plurality of repeaters including the routers and the tunneling devices:

the tunneling devices each comprising:
a communication unit for executing communication with the hosts and routers;
a packet transmit/receive unit for executing transmit/receive of packets, including packets from the hosts and a tunneling packet;
a tunneling-preparation information storage for storing routing-information on a route for transferring the tunneling packet from the tunneling device to a host at a transmission source, and tunneling-preparation information for generation of the tunneling packet;
a transfer-target multicast information storage for storing multicast information providing a transfer target of a tunneling packet in order to effect multicast communication of the tunneling packet to a multicast address where a host at the transmission destination belongs;
a tunneling packet generation unit for (1) adding transfer direction information indicating a clockwise direction and a counterclockwise direction in the ring network, on the basis of tunneling-preparation information stored in the tunneling-preparation information storage, to the packet from the host, (2) applying encapsulation processing for adding a header and various expansion headers thereto, thereby generating a tunneling packet for use in tunneling communication between the tunneling devices, and (3) determining a destination of the tunneling packet generated out of the packet from the host, on the basis of multicast information stored in the transfer-target multicast information storage, as a multicast address at the destination of the packet from the host;
a tunneling-receive processor for analyzing the tunneling packet which the packet transmit/receive unit has received from the respective routers before finding tunneling packet information on transmission destinations, transmission sources, and information on a packet before application of encapsulation processing;
a packet information storage for storing the tunneling packet information as analyzed by the tunneling-receive processor, and transferred packet information that is information on a packet that has been transferred from the tunneling device to the host at a final transmission destination;
a packet generation unit for executing de-capsulation processing on the basis of the tunneling packet information stored in the packet information storage, thereby reproducing the packet transmitted from the host at the transmission source before application of the encapsulation processing;
a transfer determination unit for determining whether or not the packet reproduced after de-capsulation processing has already been transferred to the host at the final transmission destination, determining whether or not the packet identical to the tunneling packet received from the host at the transmission source is stored in the packet information storage, and transferring the packet reproduced to the host at the final transmission destination if the packet reproduced has not been transferred as yet;
a packet-abandoning unit for abandoning packets, including the tunneling packet and the reproduced packet, if the packet identical to the tunneling packet that the transfer determination unit has received from the host at the transmission source is stored in the packet information storage; and
a direction-setting unit for acquiring a transfer-destination address of the clockwise packet, or the counterclockwise packet before setting a direction.

12. The IP network system according to claim 11, wherein each repeater comprises a router.

* * * * *